United States Patent
Gruner et al.

(10) Patent No.: US 6,901,488 B2
(45) Date of Patent: May 31, 2005

(54) COMPUTE ENGINE EMPLOYING A COPROCESSOR

(75) Inventors: Fred Gruner, Palo Alto, CA (US); Robert Hathaway, Santa Clara, CA (US); Ricardo Ramirez, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 316 days.

(21) Appl. No.: 10/105,587

(22) Filed: Mar. 25, 2002

(65) Prior Publication Data

US 2003/0014589 A1 Jan. 16, 2003

Related U.S. Application Data

(63) Continuation of application No. 09/900,481, filed on Jul. 6, 2001.

(51) Int. Cl.[7] .............................................. G06F 13/00
(52) U.S. Cl. ........................ 711/154; 711/119; 711/130
(58) Field of Search ................................ 711/119, 130, 711/154

(56) References Cited

U.S. PATENT DOCUMENTS

| | | | | |
|---|---|---|---|---|
| 5,613,136 A | * | 3/1997 | Casavant et al. ............ 712/28 |
| 5,721,855 A | * | 2/1998 | Hinton et al. ............ 712/218 |
| 6,223,260 B1 | * | 4/2001 | Gujral et al. ............ 711/145 |
| 6,374,329 B1 | * | 4/2002 | McKinney et al. ......... 711/141 |
| 6,405,289 B1 | * | 6/2002 | Arimilli et al. ............ 711/145 |
| 6,430,654 B1 | | 8/2002 | Mehrotra et al. |
| 6,539,457 B1 | | 3/2003 | Mulla et al. |
| 2001/0042190 A1 | * | 11/2001 | Tremblay et al. ........... 712/208 |
| 2002/0007443 A1 | * | 1/2002 | Gharachorloo et al. ..... 711/141 |

OTHER PUBLICATIONS

Shanley, Tom, "Pentium Pro Processor System Architecture," PC System Architecture Series, Mindshare Inc., pp. 1–200 and 461–463.

* cited by examiner

*Primary Examiner*—Reba I. Elmore
(74) *Attorney, Agent, or Firm*—Shumaker & Sieffert, PA

(57) ABSTRACT

A compute engine includes a central processing unit coupled to a coprocessor. The coprocessor includes a sequencer coupled to a set of application engines for performing operations assigned to the compute engine. The sequencer is coupled to application engines through a set of data, enable, and control interfaces. An arbiter couples the sequencer and application engines to memory. Alternatively, the coprocessor may include multiple sequencers, with each sequencer being coupled to a different set of application engines. One set of application engines includes a media access controller for communicating with a network and a data transfer engine coupling the media access controller to the arbiter. In one implementation, application engines facilitate different network services, including but not limited to: 1) virtual private networking; 2) secure sockets layer processing; 3) web caching; 4) hypertext mark-up language compression; 5) virus checking; 6) firewall support; and 7) web switching.

44 Claims, 24 Drawing Sheets

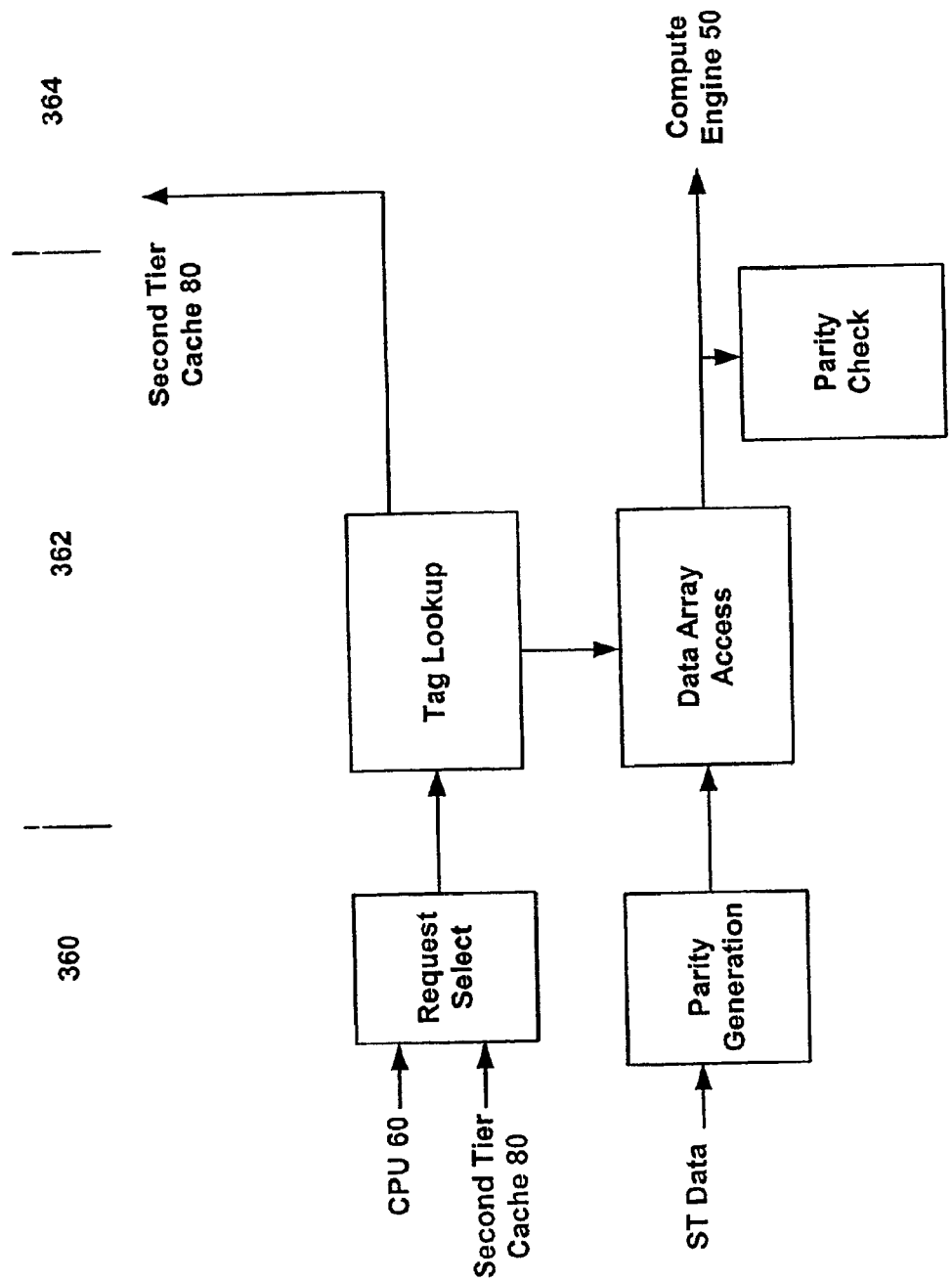

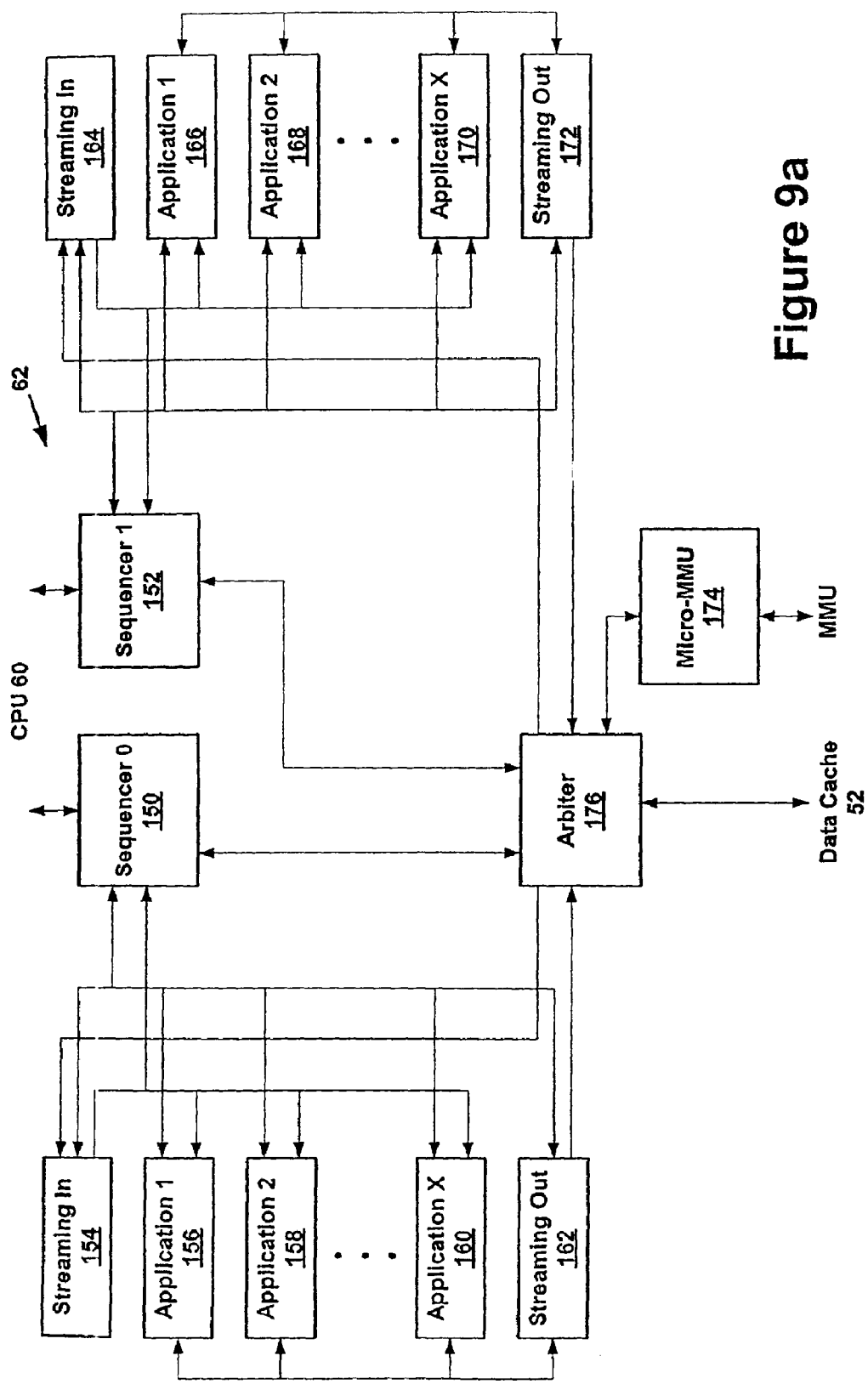

COMPUTE ENGINE EMPLOYING A COPROCESSOR

This application is a continuation of U.S. patent application Ser. No. 09/900,481, entitled "Multi-Processor System," filed on Jul. 6, 2001, which is incorporated herein by reference.

CROSS-REFERENCE TO RELATED APPLICATIONS

This Application is related to the following Applications:

"Coprocessor Including a Media Access Controller," by Frederick Gruner, Robert Hathaway, Remesh Panwar, Elango Ganesan and Nazar Zaidi, U.S. patent application Ser. No. 10/105,973, filed the same day as the present application;

"Application Processing Employing A Coprocessor," by Frederick Gruner, Robert Hathaway, Ramesh Panwar, Elango Ganesan and Nazar Zaidi, U.S. patent application Ser. No. 10/105,979, filed the same day as the present application;

"Streaming Input Engine Facilitating Data Transfers Between Application Engines And Memory," by Ricardo Ramirez and Frederick Gruner, U.S. patent application Ser. No. 10/105,862, filed the same day as the present application;

"Streaming Output Engine Facilitating Data Transfers Between Application Engines And Memory," by Ricardo Ramirez and Frederick Gruner, U.S. patent application Ser. No. 10/105,497, filed the same day as the present application;

"Transferring Data Between Cache Memory And A Media Access Controller," by Frederick Gruner, Robert Hathaway, and Ricardo Ramirez, U.S. patent application Ser. No. 10/105,857, filed the same day as the present application;

"Processing Packets In Cache Memory," by Frederick Gruner, Elango Ganesan, Nazar Zaidi, and Ramesh Panwar, U.S. patent application Ser. No. 10/105,151, filed the same day as the present application;

"Bandwidth Allocation For A Data Path," by Robert Hathaway, Frederick Gruner, and Mark Bryers, U.S. patent application Ser. No. 10/105,508, filed the same day as the present application;

"Ring-Based Memory Requests In A Shared Memory Multi-Processor," by Dave Hass, Frederick Gruner, Nazar Zaidi, Ramesh Panwar, and Mark Vilas, U.S. patent application Ser. No. 10/105,972, filed the same day as the present application;

"Managing Ownership Of A Full Cache Line Using A Store-Create Operation," by Dave Hass, Frederick Gruner, Nazar Zaidi, and Ramesh Panwar, U.S. patent application Ser. No. 10/105,925, filed the same day as the present application;

"Sharing A Second Tier Cache Memory In A Multi-Processor," by Dave Hass, Frederick Gruner, Nazar Zaidi, and Ramesh Panwar, U.S. patent application Ser. No. 10/105,924, filed the same day as the present application;

"First Tier Cache Memory Preventing Stale Data Storage," by Dave Hass, Robert Hathaway, and Frederick Gruner, U.S. patent application Ser. No. 10/105,732, filed the same day as the present application; and "Ring Based Multi-Processing System," by Dave Hass, Mark Vilas, Fred Gruner, Ramesh Panwar, and Nazar Zaidi, Ser. No. 10/105,993, filed the same day as the present application.

Each of these related Applications are incorporated herein by reference.

BACKGROUND OF THE INVENTION

1. Field of the Invention

The present invention is directed to processing network packets with multiple processing engines.

2. Description of the Related Art

Multi-processor computer systems include multiple processing engines performing operations at the same time. This is very useful when the computer system constantly receives new time-critical operations to perform.

For example, networking applications, such as routing, benefit from parallel processing. Routers receive multiple continuous streams of incoming data packets that need to be directed through complex network topologies. Routing determinations require a computer system to process packet data from many sources, as well as learn topological information about the network. Employing multiple processing engines speeds the routing process.

Another application benefiting from parallel processing is real-time video processing. A computer video system must perform complex compression and decompression operations under stringent time constraints. Employing multiple processors enhances system performance.

Parallel processing requires: (1) identifying operations to be performed, (2) assigning resources to execute these operations, and (3) executing the operations. Meeting these requirements under time and resource constraints places a heavy burden on a computer system. The system faces the challenges of effectively utilizing processing resources and making data available on demand for processing.

Over utilizing a system's processors results in long queues of applications waiting to be performed. Networking products employing traditional parallel processing encounter such processor utilization problems. These systems assign each incoming packet to a single processor for all applications. General processors, instead of specialized engines, perform applications requiring complex time-consuming operations. When each processor encounters a packet requiring complex processing, system execution speed drops substantially—processing resources become unavailable to receive new processing assignments or manage existing application queues.

Memory management also plays an important role in system performance. Many systems include main memory and cache memory, which is faster than main memory and more closely coupled to the system's processors. Systems strive to maintain frequently used data in cache memory to avoid time-consuming accesses to main memory.

Unfortunately, many applications, such as networking applications, require substantial use of main memory. Networking systems retrieve data packets from a communications network over a communications medium. Traditional systems initially store retrieved data packets in a local buffer, which the system empties into main memory. In order to perform applications using the data packets, the system moves the packets from main memory to cache memory—a time consuming process.

Traditional systems also incur costly memory transfer overhead when transmitting data packets. These systems transfer transmit packet data into main memory to await transmission, once processor operation on the data is complete—forcing the system to perform yet another main memory transfer to retrieve the data for transmission.

A need exists for a parallel processing system that effectively utilizes and manages processing and memory resources.

SUMMARY OF THE INVENTION

A multi-processor in accordance with the present invention efficiently manages processing resources and memory transfers. The multi-processor assigns applications to compute engines that are coupled to cache memory. Each compute engine includes a central processing unit coupled to coprocessor application engines. The application engines are specifically suited for servicing applications assigned to the compute engine. This enables a compute engine to be optimized for servicing the applications it will receive. For example, one compute engine may contain coprocessor application engines for interfacing with a network, while other coprocessors include different application engines.

The coprocessors also offload the central processing units from processing assigned applications. The coprocessors perform the applications, leaving the central processing units free to manage the allocation of applications. The coprocessors are coupled to the cache memory to facilitate their application processing. Coprocessors exchange data directly with cache memory—avoiding time consuming main memory transfers found in conventional computer systems. The multi-processor also couples cache memories from different compute engines, allowing them to exchange data directly without accessing main memory.

A multi-processor in accordance with the present invention is useful for servicing many different fields of parallel processing applications, such as video processing and networking. One example of a networking application is application based routing. A multi-processor application router in accordance with the present invention includes compute engines for performing the different applications required. For example, application engines enable different compute engines to perform different network services, including but not limited to: 1) virtual private networking; 2) secure sockets layer processing; 3) web caching; 4) hypertext mark-up language compression; and 5) virus checking.

These and other objects and advantages of the present invention will appear more clearly from the following description in which the preferred embodiment of the invention has been set forth in conjunction with the drawings.

BRIEF DESCRIPTION OF THE DRAWINGS

FIG. 5b illustrates a first tier instruction cache pipeline in one embodiment of the present invention.

FIGS. 9a–9c show embodiments of a coprocessor for use in a processing cluster in accordance with the present invention.

DETAILED DESCRIPTION

A. Multi-Processing Unit

Figure 1:
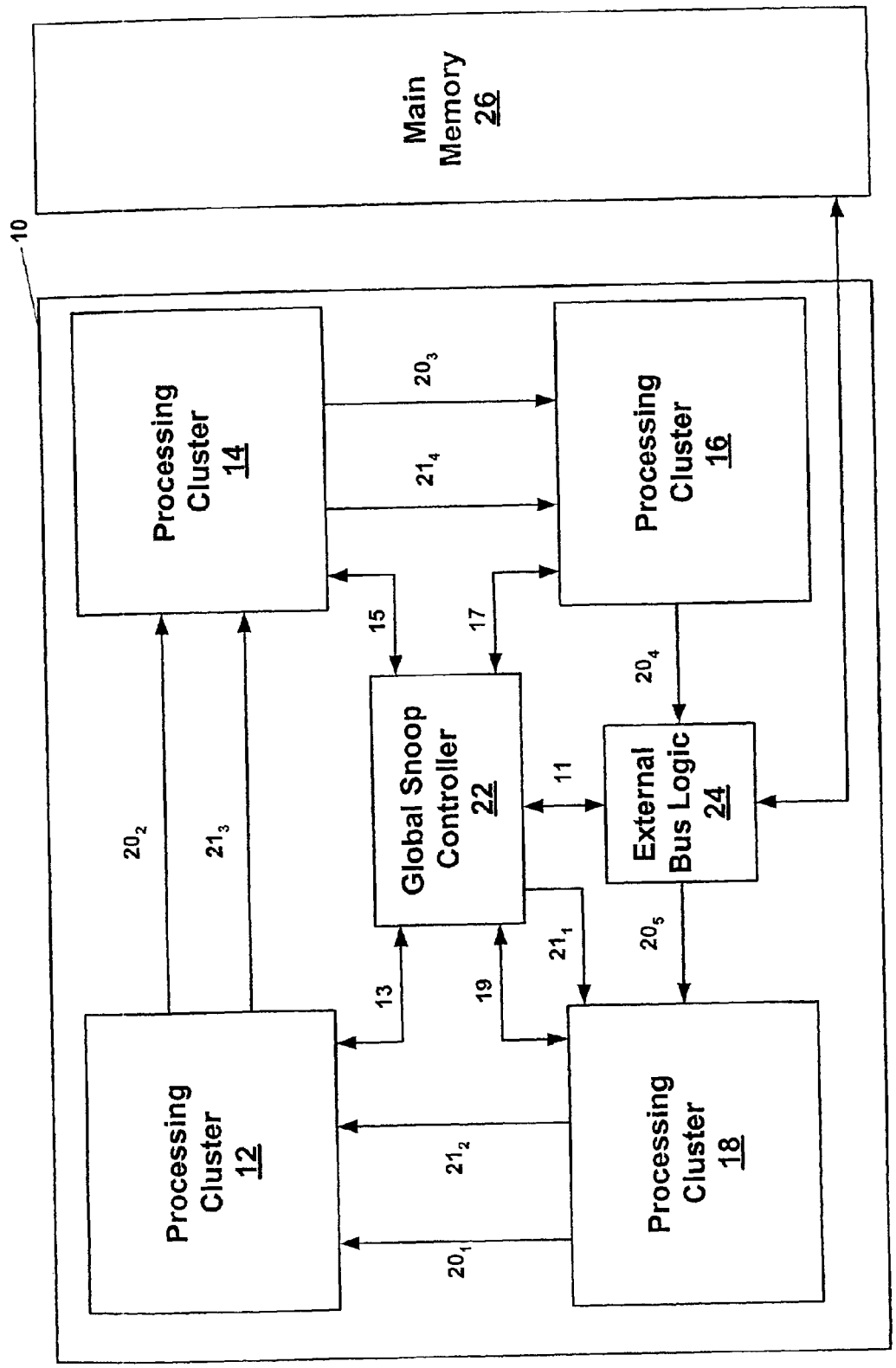
FIG. 1 illustrates a multi-processor unit in accordance with the present invention.

FIG. 1 illustrates a multi-processor unit (MPU) in accordance with the present invention. MPU 10 includes processing clusters 12, 14, 16, and 18, which perform application processing for MPU 10. Each processing cluster 12, 14, 16, and 18 includes at least one compute engine (not shown) coupled to a set of cache memory (not shown). The compute engine processes applications, and the cache memory maintains data locally for use during those applications. MPU 10 assigns applications to each processing cluster and makes the necessary data available in the associated cache memory.

MPU 10 overcomes drawbacks of traditional multi-processor systems. MPU 10 assigns tasks to clusters based on the applications they perform. This allows MPU 10 to utilize engines specifically designed to perform their assigned tasks. MPU 10 also reduces time consuming accesses to main memory 26 by passing cache data between clusters 12, 14, 16, and 18. The local proximity of the data, as well as the application specialization, expedites processing.

Global snoop controller 22 manages data sharing between clusters 12, 14, 16, and 18 and main memory 26. Clusters 12, 14, 16, and 18 are each coupled to provide memory requests to global snoop controller 22 via point-to-point connections. Global snoop controller 22 issues snoop instructions to clusters 12, 14, 16, and 18 on a snoop ring.

In one embodiment, as shown in FIG. 1, clusters 12, 14, 16, and 18 are coupled to global snoop controller 22 via point-to-point connections 13, 15, 17, and 19, respectively. A snoop ring includes coupling segments $21_{1-4}$, which will be collectively referred to as snoop ring 21. Segment $21_1$ couples global snoop controller 22 to cluster 18. Segment $21_2$ couples cluster 18 to cluster 12. Segment $21_3$ couples cluster 12 to cluster 14. Segment $21_4$ couples cluster 14 to cluster 16. The interaction between global snoop controller 22 and clusters 12, 14, 16, and 18 will be described below in greater detail.

Global snoop controller 22 initiates accesses to main memory 26 through external bus logic (EBL) 24, which couples snoop controller 22 and clusters 12, 14, 16, and 18 to main memory 26. EBL 24 transfers data between main memory 26 and clusters 12, 14, 16, and 18 at the direction of global snoop controller 22. EBL 24 is coupled to receive memory transfer instructions from global snoop controller 22 over point-to-point link 11.

EBL 24 and processing clusters 12, 14, 16, and 18 exchange data with each other over a logical data ring. In one embodiment of the invention, MPU 10 implements the data ring through a set of point-to-point connections. The data ring is schematically represented in FIG. 1 as coupling segments $20_{1-5}$ and will be referred to as data ring 20. Segment $20_1$ couples cluster 18 to cluster 12. Segment $20_2$ couples cluster 12 to cluster 14. Segment $20_3$ couples cluster 14 to cluster 16. Segment $20_4$ couples cluster 16 to EBL 24, and segment $20_5$ couples EBL 24 to cluster 18. Further details regarding the operation of data ring 20 and EBL 24 appear below.

Figure 2:
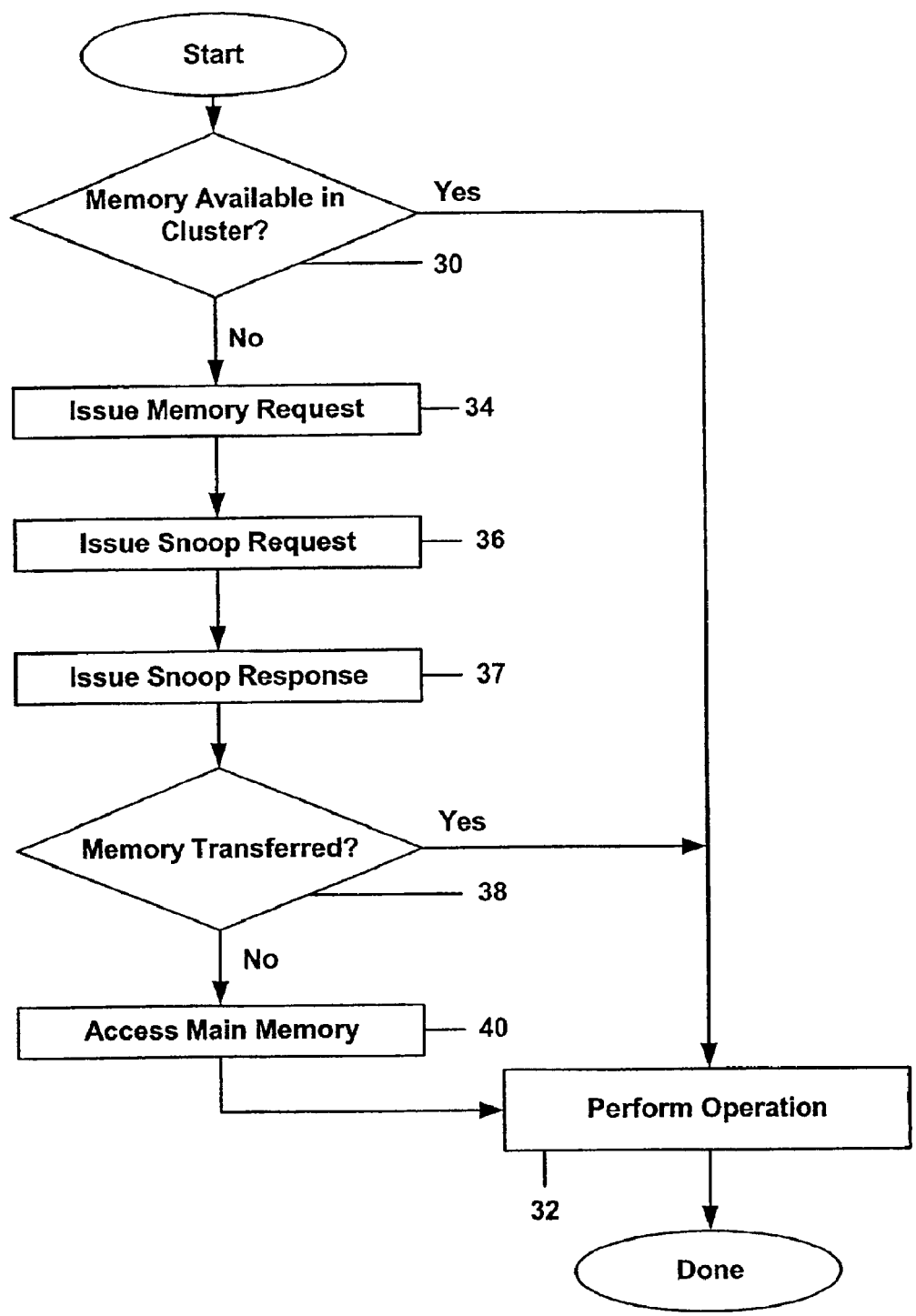
FIG. 2 illustrates a process employed by the multi-processor unit in FIG. 1 to exchange data in accordance with the present invention.

FIG. 2 illustrates a process employed by MPU 10 to transfer data and memory location ownership in one embodiment of the present invention. For purposes of illustration, FIG. 2 demonstrates the process with cluster 12—the same process is applicable to clusters 14, 16, and 18.

Processing cluster 12 determines whether a memory location for an application operation is mapped into the cache memory in cluster 12 (step 30). If cluster 12 has the location, then cluster 12 performs the operation (step 32). Otherwise, cluster 12 issues a request for the necessary memory location to global snoop controller 22 (step 34). In one embodiment, cluster 12 issues the request via point-to-point connection 13. As part of the request, cluster 12 forwards a request descriptor that instructs snoop controller 22 and aids in tracking a response to the request.

Global snoop controller 22 responds to the memory request by issuing a snoop request to clusters 14, 16, and 18 (step 36). The snoop request instructs each cluster to transfer either ownership of the requested memory location or the location's content to cluster 12. Clusters 14, 16, and 18 each respond to the snoop request by performing the requested action or indicating it does not possess the requested location (step 37). In one embodiment, global snoop controller 22 issues the request via snoop ring 21, and clusters 14, 16, and 18 perform requested ownership and data transfers via snoop ring 21. In addition to responding on snoop ring 21, clusters acknowledge servicing the snoop request through their point-to-point links with snoop controller 22. Snoop request processing will be explained in greater detail below.

If one of the snooped clusters possesses the requested memory, the snooped cluster forwards the memory to cluster 12 using data ring 20 (step 37). In one embodiment, no data is transferred, but the requested memory location's ownership is transferred to cluster 12. Data and memory location transfers between clusters will be explained in greater detail below.

Global snoop controller 22 analyzes the clusters' snoop responses to determine whether the snooped clusters owned and transferred the desired memory (step 38). If cluster 12 obtained access to the requested memory location in response to the snoop request, cluster 12 performs the application operations (step 32). Otherwise, global snoop controller 22 instructs EBL 24 to carry out an access to main memory 26 (step 40). EBL 24 transfers data between cluster 12 and main memory 26 on data ring 20. Cluster 12 performs the application operation once the main memory access is completed (step 32).

B. Processing Cluster

In one embodiment of the present invention, a processing cluster includes a single compute engine for performing applications. In alternate embodiments, a processing cluster employs multiple compute engines. A processing cluster in one embodiment of the present invention also includes a set of cache memory for expediting application processing. Embodiments including these features are described below.

1. Processing Cluster—Single Compute Engine

Figure 3:
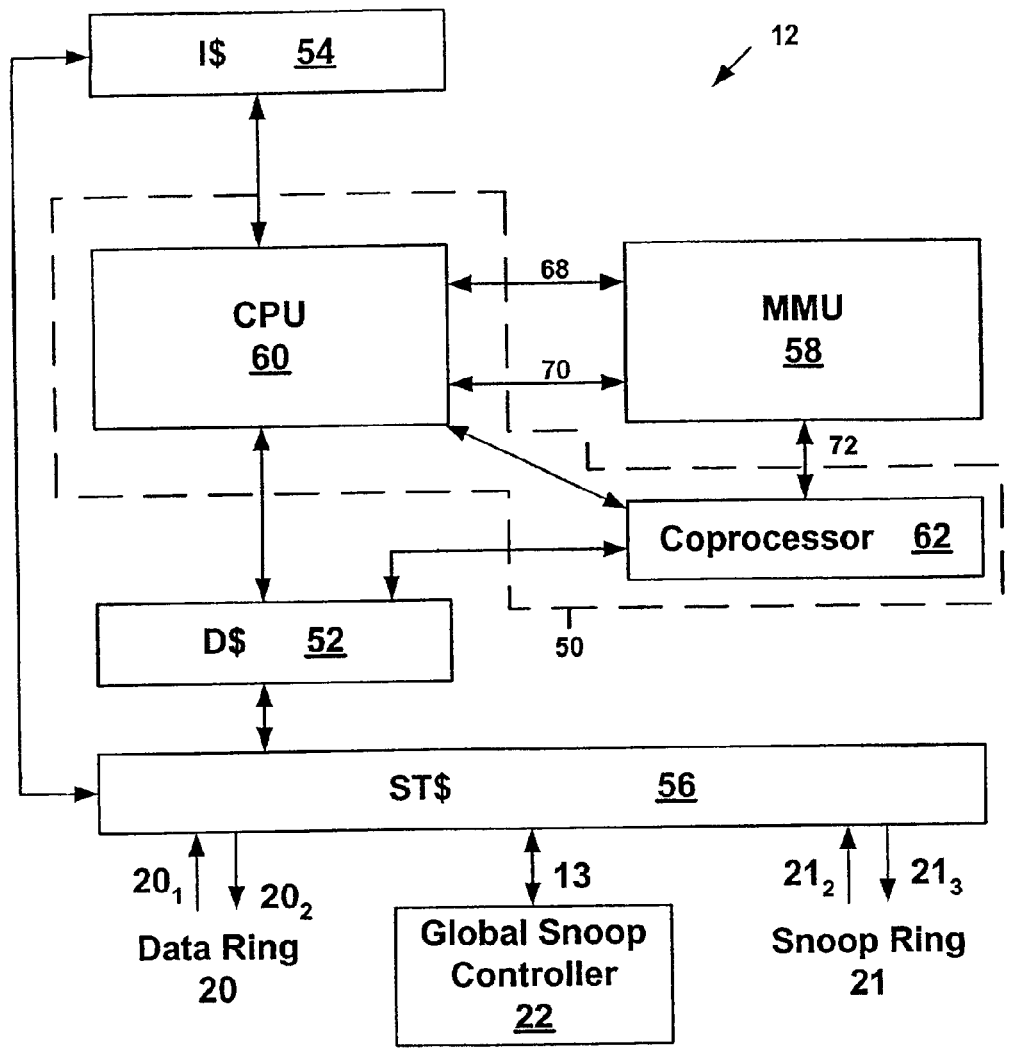
FIG. 3 shows a processing cluster employed in one embodiment of the multi-processor unit in FIG. 1.

FIG. 3 shows one embodiment of a processing cluster in accordance with the present invention. For purposes of illustration, FIG. 3 shows processing cluster 12. In some embodiments of the present invention, the circuitry shown in FIG. 3 is also employed in clusters 14, 16, and 18.

Cluster 12 includes compute engine 50 coupled to first tier data cache 52, first tier instruction cache 54, second tier cache 56, and memory management unit (MMU) 58. Both instruction cache 54 and data cache 52 are coupled to second tier cache 56, which is coupled to snoop controller 22, snoop ring 21, and data ring 20. Compute engine 50 manages a queue of application requests, each requiring an application to be performed on a set of data.

When compute engine 50 requires access to a block of memory, compute engine 50 converts a virtual address for the block of memory into a physical address. In one embodiment of the present invention, compute engine 50 internally maintains a limited translation buffer (not shown). The internal translation buffer performs conversions within compute engine 50 for a limited number of virtual memory addresses.

Compute engine 50 employs MMU 58 for virtual memory address conversions not supported by the internal translation buffer. In one embodiment, compute engine 50 has separate conversion request interfaces coupled to MMU 58 for data accesses and instruction accesses. As shown in FIG. 3, compute engine 50 employs request interfaces 70 and 72 for data accesses and request interface 68 for instruction access.

In response to a conversion request, MMU 58 provides either a physical address and memory block size or a failed access response. The failed access responses include: 1) no corresponding physical address exists; 2) only read access is allowed and compute engine 50 is attempting to write; or 3) access is denied.

After obtaining a physical address, compute engine 50 provides the address to either data cache 52 or instruction cache 54—data accesses go to data cache 52, and instruction accesses go to instruction cache 54. In one embodiment, first tier caches 52 and 54 are 4K direct-mapped caches, with data cache 52 being write-through to second tier cache 56. In an alternate embodiment, caches 52 and 54 are 8K 2-way set associative caches.

A first tier cache (52 or 54) addressed by compute engine 50 determines whether the addressed location resides in the addressed first tier cache. If so, the cache allows compute engine 50 to perform the requested memory access. Otherwise, the first tier cache forwards the memory access of compute engine 50 to second tier cache 56. In one embodiment second tier cache 56 is a 64K 4-way set associative cache.

Second tier cache 56 makes the same determination as the first tier cache. If second tier cache 56 contains the requested memory location, compute engine 50 exchanges information with second tier cache 56 through first tier cache 52 or 54. Instructions are exchanged through instruction cache 54, and data is exchanged through data cache 52. Otherwise, second tier cache 56 places a memory request to global snoop controller 22, which performs a memory retrieval process. In one embodiment, the memory retrieval process is the process described above with reference to FIG. 2. Greater detail and embodiments addressing memory transfers will be described below.

Cache 56 communicates with snoop controller 22 via point-to-point link 13 and snoop ring interfaces $21_1$ and $21_3$, as described in FIG. 1. Cache 56 uses link 13 to request memory accesses outside cluster 12. Second tier cache 56 receives and forwards snoop requests on snoop ring interfaces $21_2$ and $21_3$. Cache 56 uses data ring interface segments $20_1$ and $20_2$ for exchanging data on data ring 20, as described above with reference to FIGS. 1 and 2.

In one embodiment, compute engine 50 contains CPU 60 coupled to coprocessor 62. CPU 60 is coupled to MMU 58, data cache 52, and instruction cache 54. Instruction cache 54 and data cache 52 couple CPU 60 to second tier cache 56. Coprocessor 62 is coupled to data cache 52 and MMU 58. First tier data cache 52 couples coprocessor 62 to second tier cache 56.

Coprocessor 62 helps MPU 10 overcome processor utilization drawbacks associated with traditional multiprocessing systems. Coprocessor 62 includes application specific processing engines designed to execute applications assigned to compute engine 50. This allows CPU 60 to offload application processing to coprocessor 62, so CPU 60 can effectively manage the queue of assigned application.

In operation, CPU 60 instructs coprocessor 62 to perform an application from the application queue. Coprocessor 62 uses its interfaces to MMU 58 and data cache 52 to obtain access to the memory necessary for performing the application. Both CPU 60 and coprocessor 62 perform memory accesses as described above for compute engine 50, except that coprocessor 62 doesn't perform instruction fetches.

In one embodiment, CPU 60 and coprocessor 62 each include limited internal translation buffers for converting virtual memory addresses to physical addresses. In one such embodiment, CPU 60 includes 2 translation buffer entries for instruction accesses and 3 translation buffer entries for data accesses. In one embodiment, coprocessor 62 includes 4 translation buffer entries.

Coprocessor 62 informs CPU 60 once an application is complete. CPU 60 then removes the application from its queue and instructs a new compute engine to perform the next application—greater details on application management will be provided below.

2. Processing Cluster—Multiple Compute Engines

Figure 4:
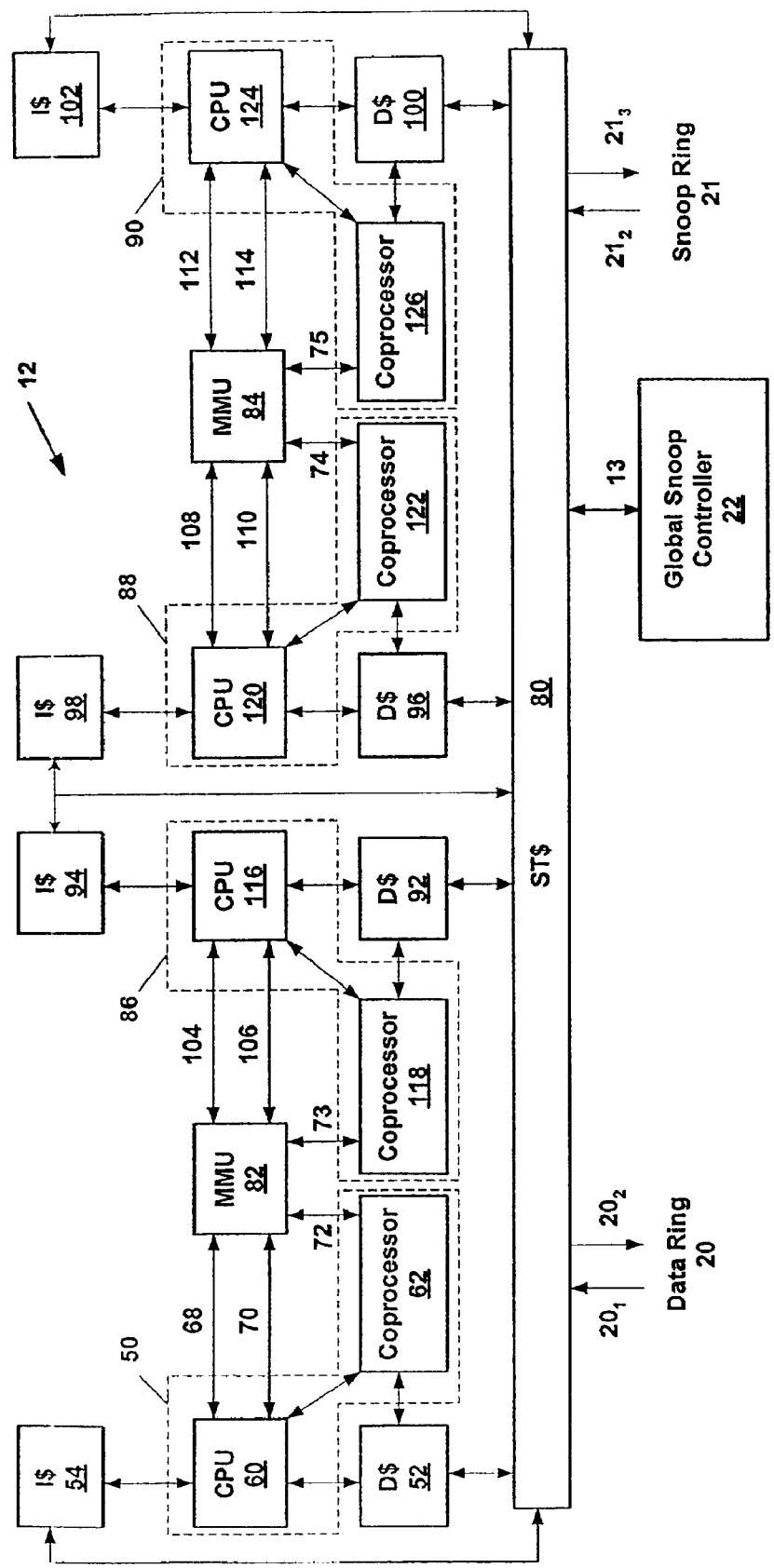
FIG. 4 shows a processing cluster employed in another embodiment of the multi-processor unit in FIG. 1.

FIG. 4 illustrates an alternate embodiment of processing cluster 12 in accordance with the present invention. In FIG. 4, cluster 12 includes multiple compute engines operating the same as above-described compute engine 50. Cluster 12 includes compute engine 50 coupled to data cache 52, instruction cache 54, and MMU 82. Compute engine 50 includes CPU 60 and coprocessor 62 having the same coupling and operation described above in FIG. 3. In fact, all elements appearing in FIG. 4 with the same numbering as in FIG. 3 have the same operation as described in FIG. 3.

MMU 82 and MMU 84 operate the same as MMU 58 in FIG. 3, except MMU 82 and MMU 84 each support two compute engines. In an alternate embodiment, cluster 12 includes 4 MMUs, each coupled to a single compute engine. Second tier cache 80 operates the same as second tier cache 56 in FIG. 3, except second tier cache 80 is coupled to and supports data caches 52, 92, 96, and 100 and instruction caches 54, 94, 98, and 102. Data caches 52, 92, 96, and 100 in FIG. 4 operate the same as data cache 52 in FIG. 3, and instruction caches 54, 94, 98, and 102 operate the same as instruction cache 54 in FIG. 3. Compute engines 50, 86, 88, and 90 operate the same as compute engine 50 in FIG. 3.

Each compute engine (50, 86, 88, and 90) also includes a CPU (60, 116, 120, and 124, respectively) and a coprocessor (62, 118, 122, and 126, respectively) coupled and operating the same as described for CPU 60 and coprocessor 62 in FIG. 3. Each CPU (60, 116, 120, and 124) is coupled to a data cache (52, 92, 96, and 100, respectively), instruction cache (54, 94, 98, and 102, respectively), and MMU (82 and 84). Each coprocessor (62, 118, 122, and 126, respectively) is coupled to a data cache (52, 92, 96, and 100, respectively) and MMU (82 and 84). Each CPU (60, 116, 120, and 124) communicates with the MMU (82 and 84) via separate conversion request interfaces for data (70, 106, 110, and 114, respectively) and instructions (68, 104, 108, and 112, respectively) accesses. Each coprocessor (62, 118, 122, and 126) communicates with the MMU (82 and 84) via a conversion request interface (72, 73, 74, and 75) for data accesses.

In one embodiment, each coprocessor (62, 118, 122, and 126) includes four internal translation buffers, and each CPU (60, 116, 120, and 124) includes 5 internal translation buffers, as described above with reference to FIG. 3. In one such embodiment, translation buffers in coprocessors coupled to a common MMU contain the same address conversions.

In supporting two compute engines, MMU 82 and MMU 84 each provide arbitration logic to chose between requesting compute engines. In one embodiment, MMU 82 and MMU 84 each arbitrate by servicing competing compute engines on an alternating basis when competing address translation requests are made. For example, in such an embodiment, MMU 82 first services a request from compute engine 50 and then services a request from compute engine 86, when simultaneous translation requests are pending.

3. Processing Cluster Memory Management

The following describes a memory management system for MPU 10 in one embodiment of the present invention. In this embodiment, MPU 10 includes the circuitry described above with reference to FIG. 4.

a. Data Ring

Data ring 20 facilitates the exchange of data and instructions between clusters 12, 14, 16, and 18 and EBL 24. Data ring 20 carries packets with both header information and a payload. The payload contains either data or instructions from a requested memory location. In operation, either a cluster or EBL 24 places a packet on a segment of data ring 20. For example, cluster 18 drives data ring segment $20_1$ into cluster 12. The header information identifies the intended target for the packet. The EBL and each cluster pass the packet along data ring 20 until the packet reaches the intended target. When a packet reaches the intended target (EBL 24 or cluster 12, 14, 16, or 18) the packet is not transferred again.

In one embodiment of the present invention, data ring 20 includes the following header signals: 1) Validity—indicating whether the information on data ring 20 is valid; 2) Cluster—identifying the cluster that issues the memory request leading to the data ring transfer; 3) Memory Request—identifying the memory request leading to the data ring transfer; 4) MESI—providing ownership status; and 5) Transfer Done—indicating whether the data ring transfer is the last in a connected series of transfers. In addition to the header, data ring 20 includes a payload. In one embodiment, the payload carries 32 bytes. In alternate embodiments of the present invention, different fields can be employed on the data ring.

In some instances, a cluster needs to transfer more bytes than a single payload field can store. For example, second tier cache 80 typically transfers an entire 64 byte cache line. A transfer of this size is made using two transfers on data ring 20—each carrying a 32 byte payload. By using the header information, multiple data ring payload transfers can be concatenated to create a single payload in excess of 32 bytes. In the first transfer, the Transfer Done field is set to indicate the transfer is not done. In the second transfer, the Transfer Done field indicates the transfer is done.

The MESI field provides status about the ownership of the memory location containing the payload. A device initiating a data ring transfer sets the MESI field, along with the other header information. The MESI field has the following four states: 1) Modified; 2) Exclusive; 3) Shared; and 4) Invalid. A device sets the MESI field to Exclusive if the device possesses sole ownership of the payload data prior to transfer on data ring 20. A device sets the MESI field to Modified if the device modifies the payload data prior to transfer on data ring 20—only an Exclusive or Modified owner can modify data. A device sets the MESI field to Shared if the data being transferred onto data ring 20 currently has a Shared or Exclusive setting in the MESI field and another entity requests ownership of the data. A device sets the MESI field to Invalid if the data to be transferred on data ring 20 is invalid. Examples of MESI field setting will be provided below.

b. First Tier Cache Memory

Figure 5A:
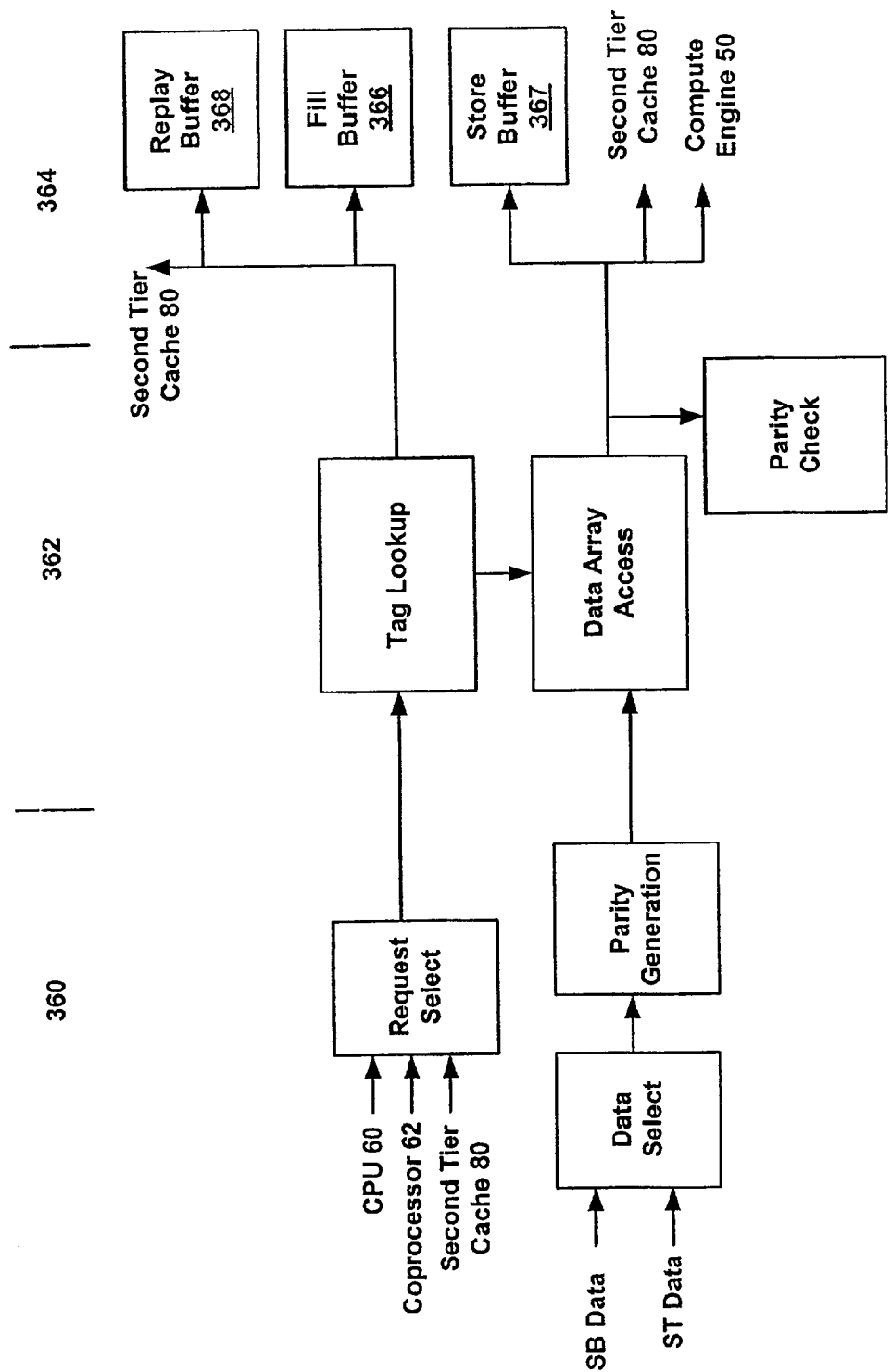
FIG. 5a illustrates a first tier data cache pipeline in one embodiment of the present invention.

FIG. 5a illustrates a pipeline of operations performed by first tier data caches 52, 92, 96, 100, in one embodiment of the present invention. For ease of reference, FIG. 5 is explained with reference to data cache 52, although the implementation shown in FIG. 5 is applicable to all first tier data caches.

In stage 360, cache 52 determines whether to select a memory access request from CPU 60, coprocessor 62, or second tier cache 80. In one embodiment, cache 52 gives cache 80 the highest priority and toggles between selecting the CPU and coprocessor. As will be explained below, second tier cache 80 accesses first tier cache 52 to provide fill data when cache 52 has a miss.

In stage 362, cache 52 determines whether cache 52 contains the memory location for the requested access. In one embodiment, cache 52 performs a tag lookup using bits from the memory address of the CPU, coprocessor, or second tier cache. If cache 52 detects a memory location match, the cache's data array is also accessed in stage 362 and the requested operation is performed.

In the case of a load operation from compute engine 50, cache 52 supplies the requested data from the cache's data array to compute engine 50. In the case of a store operation, cache 52 stores data supplied by compute engine 50 in the cache's data array at the specified memory location. In one embodiment of the present invention, cache 52 is a write-through cache that transfers all stores through to second tier cache 80. The store operation only writes data into cache 52 after a memory location match—cache 52 is not filled after a miss. In one such embodiment, cache 52 is relieved of maintaining cache line ownership.

In one embodiment of the present invention, cache 52 implements stores using a read-modify-write protocol. In such an embodiment, cache 52 responds to store operations by loading the entire data array cache line corresponding to the addressed location into store buffer 367. Cache 52 modifies the data in store buffer 367 with data from the store instruction issued by compute engine 50. Cache 52 then stores the modified cache line in the data array when cache 52 has a free cycle. If a free cycle doesn't occur before the next write to store buffer 367, cache 52 executes the store without using a free cycle.

In an alternate embodiment, the store buffer is smaller than an entire cache line, so cache 52 only loads a portion of the cache line into the store buffer. For example, in one embodiment cache 52 has a 64 byte cache line and a 16 byte store buffer. In load operations, data bypasses store buffer 367.

Cache 52 also provides parity generation and checking. When cache 52 writes the data array, a selection is made in stage 360 between using store buffer data (SB Data) and second tier cache fill data (ST Data). Cache 52 also performs parity generation on the selected data in stage 360 and writes the data array in stage 362. Cache 52 also parity checks data supplied from the data array in stage 362.

If cache 52 does not detect an address match in stage 362, then cache 52 issues a memory request to second tier cache 80. Cache 52 also issues a memory request to cache 80 if cache 52 recognizes a memory operation as non-cacheable.

Other memory related operations issued by compute engine 50 include pre-fetch and store-create. A pre-fetch operation calls for cache 52 to ensure that an identified cache line is mapped into the data array of cache 52. Cache 52 operates the same as a load operation of a full cache line, except no data is returned to compute engine 50. If cache 52 detects an address match in stage 362 for a pre-fetch operation, no further processing is required. If an address miss is detected, cache 52 forwards the pre-fetch request to cache 80. Cache 52 loads any data returned by cache 80 into the cache 52 data array.

A store-create operation calls for cache 52 to ensure that cache 52 is the sole owner of an identified cache line, without regard for whether the cache line contains valid data. In one embodiment, a predetermined pattern of data is written into the entire cache line. The predetermined pattern is repeated throughout the entire cache line. Compute engine 50 issues a store-create command as part of a store operand for storing data into an entire cache line. All store-create requests are forwarded to cache 80, regardless of whether an address match occurs.

In one embodiment, cache 52 issues memory requests to cache 80 over a point-to-point link, as shown in FIGS. 3 and 4. This link allows cache 80 to receive the request and associated data and respond accordingly with data and control information. In one such embodiment, cache 52 provides cache 80 with a memory request that includes the following fields: 1) Validity—indicating whether the request is valid; 2) Address—identifying the memory location requested; and 3) Opcode—identifying the memory access operation requested.

After receiving the memory request, cache 80 generates the following additional fields: 4) Dependency—identifying memory access operations that must be performed before the requested memory access; 5) Age—indicating the time period the memory request has been pending; and 6) Sleep—indicating whether the memory request has been placed in sleep mode, preventing the memory request from being reissued. Sleep mode will be explained in further detail below. Cache 80 sets the Dependency field in response to the Opcode field, which identifies existing dependencies.

In one embodiment of the present invention, cache 52 includes fill buffer 366 and replay buffer 368. Fill buffer 366 maintains a list of memory locations from requests transferred to cache 80. The listed locations correspond to requests calling for loads. Cache 52 employs fill buffer 366 to match incoming fill data from second tier cache 80 with corresponding load commands. The corresponding load command informs cache 52 whether the incoming data is a cacheable load for storage in the cache 52 data array or a non-cacheable load for direct transfer to computer engine 50.

As an additional benefit, fill buffer 366 enables cache 52 to avoid data corruption from an overlapping load and store to the same memory location. If compute engine 50 issues a store to a memory location listed in fill buffer 366, cache 52 will not write data returned by cache 80 for the memory location to the data array. Cache 52 removes a memory location from fill buffer 366 after cache 80 services the associated load. In one embodiment, fill buffer 366 contains 5 entries.

Replay buffer 368 assists cache 52 in transferring data from cache 80 to compute engine 50. Replay buffer 368 maintains a list of load requests forwarded to cache 80. Cache 80 responds to a load request by providing an entire cache line—up to 64 bytes in one embodiment. When a load request is listed in replay buffer 368, cache 52 extracts the requested load memory out of the returned cache line for compute engine 50. This relieves cache 52 from retrieving the desired memory from the data array after a fill completes.

Cache 52 also uses replay buffer 368 to perform any operations necessary before transferring the extracted data back to compute engine 50. For example, cache 80 returns an entire cache line of data, but in some instances compute engine 50 only requests a portion of the cache line. Replay buffer 368 alerts cache 52, so cache 52 can realign the extracted data to appear in the data path byte positions desired by compute engine 50. The desired data operations, such as realignments and rotations, are stored in replay buffer 368 along with their corresponding requests.

FIG. 5b shows a pipeline of operations for first tier instructions caches 54, 94, 98, and 102 in one embodiment of the present invention. The pipeline shown in FIG. 5b is similar to the pipeline shown in FIG. 5a, with the following exceptions. A coprocessor does not access a first tier instruction cache, so the cache only needs to select between a CPU and second tier cache in stage 360. A CPU does not write to an instruction cache, so only second tier data (ST Data) is written into the cache's data array in step 362. An instruction cache does not include either a fill buffer, replay buffer, or store buffer.

c. Second Tier Cache Memory

Figure 6:
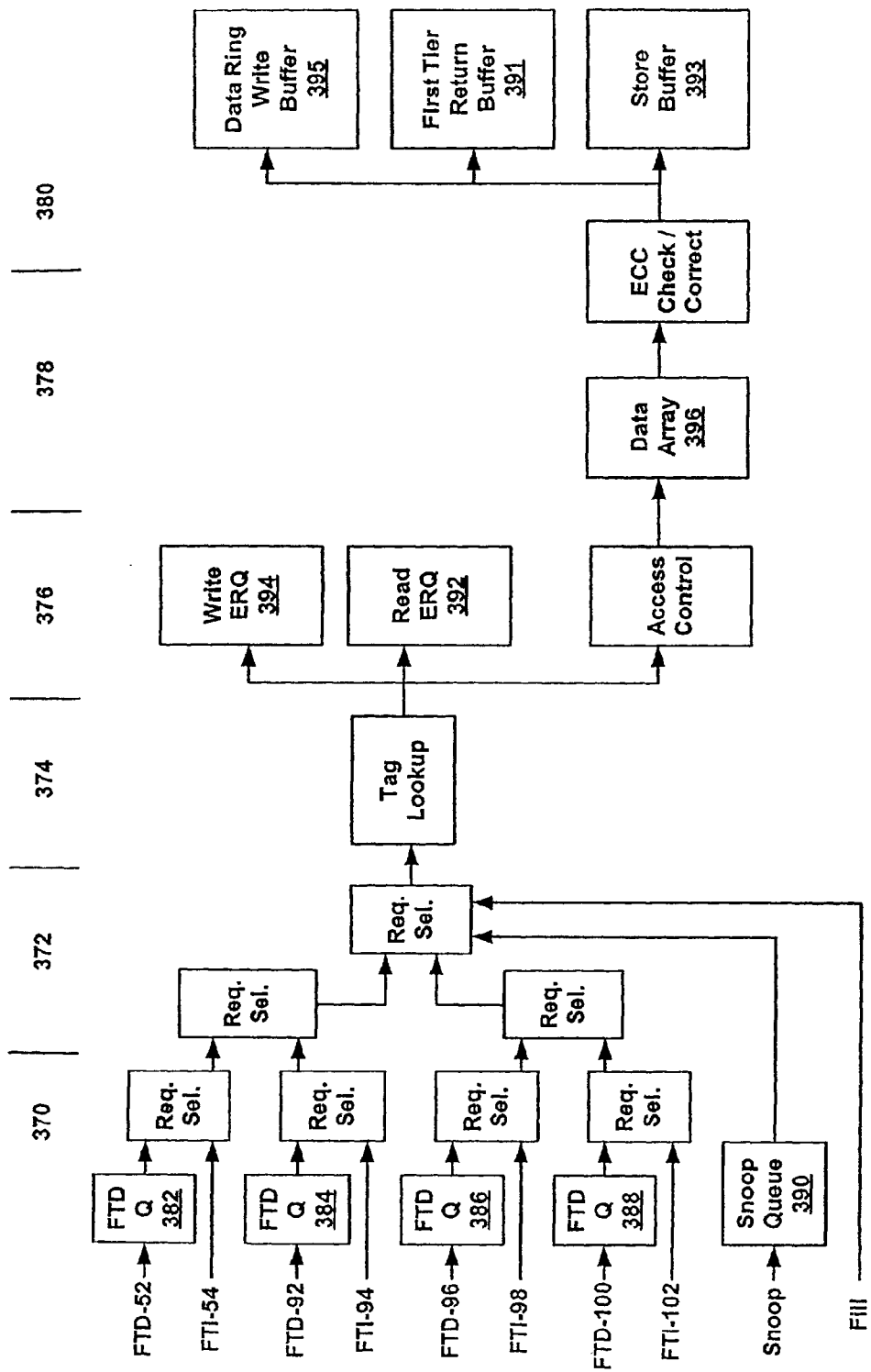
FIG. 6 illustrates a second tier cache pipeline in one embodiment of the present invention.

FIG. 6 illustrates a pipeline of operations implemented by second tier cache 80 in one embodiment of the present invention. In stage 370, cache 80 accepts memory requests. In one embodiment, cache 80 is coupled to receive memory requests from external sources (Fill), global snoop controller 22 (Snoop), first tier data caches 52, 92, 96, and 100 (FTD-52; FTD-92; FTD-96; FTD-100), and first tier instruction caches 54, 94, 98, and 102 (FTI-54; FTI-94; FTI-98; FTI-102). In one embodiment, external sources include external bus logic 24 and other clusters seeking to drive data on data ring 20.

As shown in stage 370, cache 80 includes memory request queues 382, 384, 386, and 388 for receiving and maintaining memory requests from data caches 54, 52, 92, 96, and 100, respectively. In one embodiment, memory request queues 382, 384, 386, and 388 hold up to 8 memory requests. Each queue entry contains the above-described memory request descriptor, including the Validity, Address, Opcode, Dependency, Age, and Sleep fields. If a first tier data cache attempts to make a request when its associated request queue is full, cache 80 signals the first tier cache that the request cannot be accepted. In one embodiment, the first tier cache responds by submitting the request later. In an alternate embodiment, the first tier cache kills the requested memory operation.

Cache 80 also includes snoop queue 390 for receiving and maintaining requests from snoop ring 21. Upon receiving a snoop request, cache 80 buffers the request in queue 390 and forwards the request to the next cluster on snoop ring 21. In one embodiment of the present invention, global snoop controller 22 issues the following types of snoop requests: 1) Own—instructing a cluster to transfer exclusive ownership of a memory location and transfer its content to another cluster after performing any necessary coherency updates; 2) Share—instructing a cluster to transfer shared ownership of a memory location and transfer its contents to another cluster after performing any necessary coherency updates; and 3) Kill—instructing a cluster to release ownership of a memory location without performing any data transfers or coherency updates.

In one such embodiment, snoop requests include descriptors with the following fields: 1) Validity—indicating whether the snoop request is valid; 2) Cluster—identifying the cluster that issued the memory request leading to the snoop request; 3) Memory Request—identifying the memory request leading to the snoop request; 4) ID—an identifier global snoop controller 22 assigns to the snoop request; 5) Address—identifying the memory location requested; and 5) Opcode—identifying the type of snoop request.

Although not shown, cache 80 includes receive data buffers, in addition to the request queues shown in stage 370. The receive data buffers hold data passed from cache 52 for use in requested memory operations, such as stores. In one embodiment, cache 80 does not contain the receive data buffers for data received from data ring 20 along with Fill requests, since Fill requests are serviced with the highest priority.

Cache 80 includes a scheduler for assigning priority to the above-described memory requests. In stage 370, the scheduler begins the prioritization process by selecting requests that originate from snoop queue 390 and each of compute engines 50, 86, 88, and 90, if any exist. For snoop request queue 390, the scheduler selects the first request with a Validity field showing the request is valid. In one embodiment, the scheduler also selects an entry before it remains in queue 390 for a predetermined period of time.

For each compute engine, the scheduler gives first tier instruction cache requests (FTI) priority over first tier data cache requests (FTD). In each data cache request queue (382, 384, 386, and 388), the scheduler assigns priority to memory requests based on predetermined criteria. In one embodiment, the predetermined criteria are programmable. A user can elect to have cache 80 assign priority based on a request's Opcode field or the age of the request. The scheduler employs the above-described descriptors to make these priority determinations.

For purposes of illustration, the scheduler's programmable prioritization is described with reference to queue 382. The same prioritization process is performed for queues 384, 386, and 388. In one embodiment, priority is given to load requests. The scheduler in cache 80 reviews the Opcode fields of the request descriptors in queue 382 to identify all load operations. In an alternate embodiment, store operations are favored. The scheduler also identifies these operations by employing the Opcode field.

In yet another embodiment, cache 80 gives priority to the oldest requests in queue 382. The scheduler in cache 80 accesses the Age field in the request descriptors in queue 382 to determine the oldest memory request. Alternative embodiments also provide for giving priority to the newest request. In some embodiments of the present invention, prioritization criteria are combined. For example, cache 80 gives priority to load operations and a higher priority to older load operations. Those of ordinary skill in the art recognize that many priority criteria combinations are possible.

In stage 372, the scheduler selects a single request from the following: 1) the selected first tier cache requests; 2) the selected snoop request from stage 370; and 3) Fill. In one embodiment, the scheduler gives Fill the highest priority, followed by Snoop, which is followed by the first tier cache requests. In one embodiment, the scheduler in cache 80 services the first tier cache requests on a round robin basis.

In stage 374, cache 80 determines whether it contains the memory location identified in the selected request from stage 372. If the selected request is Fill from data ring 20, cache 80 uses information from the header on data ring 20 to determine whether the cluster containing cache 80 is the target cluster for the data ring packet. Cache 80 examines the header's Cluster field to determine whether the Fill request corresponds to the cluster containing cache 80.

If any request other than Fill is selected in stage 372, cache 80 uses the Address field from the corresponding request descriptor to perform a tag lookup operation. In the tag lookup operation, cache 80 uses one set of bits in the request descriptor's Address field to identify a targeted set of ways. Cache 80 then compares another set of bits in the Address field to tags for the selected ways. If a tag match occurs, the requested memory location is in the cache 80 data array. Otherwise, there is a cache miss. In one such embodiment, cache 80 is a 64K 4-way set associative cache with a cache line size of 64 bytes.

In one embodiment, as shown in FIG. 6, cache 80 performs the tag lookup or Cluster field comparison prior to reading any data from the data array in cache 80. This differs from a traditional multiple-way set associate cache. A traditional multiple-way cache reads a line of data from each addressed way at the same time a tag comparison is made. If there is not a match, the cache discards all retrieved data. If there is a match, the cache employs the retrieved data from the selected way. Simultaneously retrieving data from multiple ways consumes considerable amounts of both power and circuit area.

Conserving both power and circuit area are important considerations in manufacturing integrated circuits. In one embodiment, cache 80 is formed on a single integrated circuit. In another embodiment, MPU 10 is formed on a single integrated circuit. Performing the lookups before retrieving cache memory data makes cache 80 more suitable for inclusion on a single integrated circuit.

In stage 376, cache 80 responds to the cache address comparison performed in stage 374. Cache 80 contains read external request queue ("read ERQ") 392 and write external request queue ("write ERQ") 394 for responding to hits and misses detected in stage 374. Read ERQ 392 and write ERQ 394 allow cache 80 to forward memory access requests to global snoop controller 22 for further processing.

In one embodiment, read ERQ 392 contains 16 entries, with 2 entries reserved for each compute engine. Read ERQ 392 reserves entries, because excessive pre-fetch operations from one compute engine may otherwise consume the entire read ERQ. In one embodiment, write ERQ 394 includes 4 entries. Write ERQ 394 reserves one entry for requests that require global snoop controller 22 to issue snoop requests on snoop ring 21.

Processing First Tier Request Hits: Once cache 80 detects an address match for a first tier load or store request, cache 80 accesses internal data array 396, which contains all the cached memory locations. The access results in data array 396 outputting a cache line containing the addressed memory location in stage 378. In one embodiment, the data array has a 64 byte cache line and is formed by 8 8K buffers, each having a data path 8 bytes wide. In such an embodiment, cache 80 accesses a cache line by addressing the same offset address in each of the 8 buffers.

An Error Correcting Code ("ECC") check is performed on the retrieved cache line to check and correct any cache line errors. ECC is a well-known error detection and correction operation. The ECC operation overlaps between stages 378 and 380.

If the requested operation is a load, cache 80 supplies the cache line contents to first tier return buffer 391. First tier return buffer 391 is coupled to provide the cache line to the requesting first tier cache. In one embodiment of the present invention, cache 80 includes multiple first tier return buffers (not shown) for transferring data back to first tier caches. In one such embodiment, cache 80 includes 4 first tier return buffers.

If the requested operation is a store, cache 80 performs a read-modify-write operation. Cache 80 supplies the addressed cache line to store buffer 393 in stage 380. Cache 80 modifies the store buffer bytes addressed by the first tier memory request. Cache 80 then forwards the contents of the store buffer to data array 396. Cache 80 makes this transfer once cache 80 has an idle cycle or a predetermined period of time elapses. For stores, no data is returned to first tier data cache 52.

Figure 7:
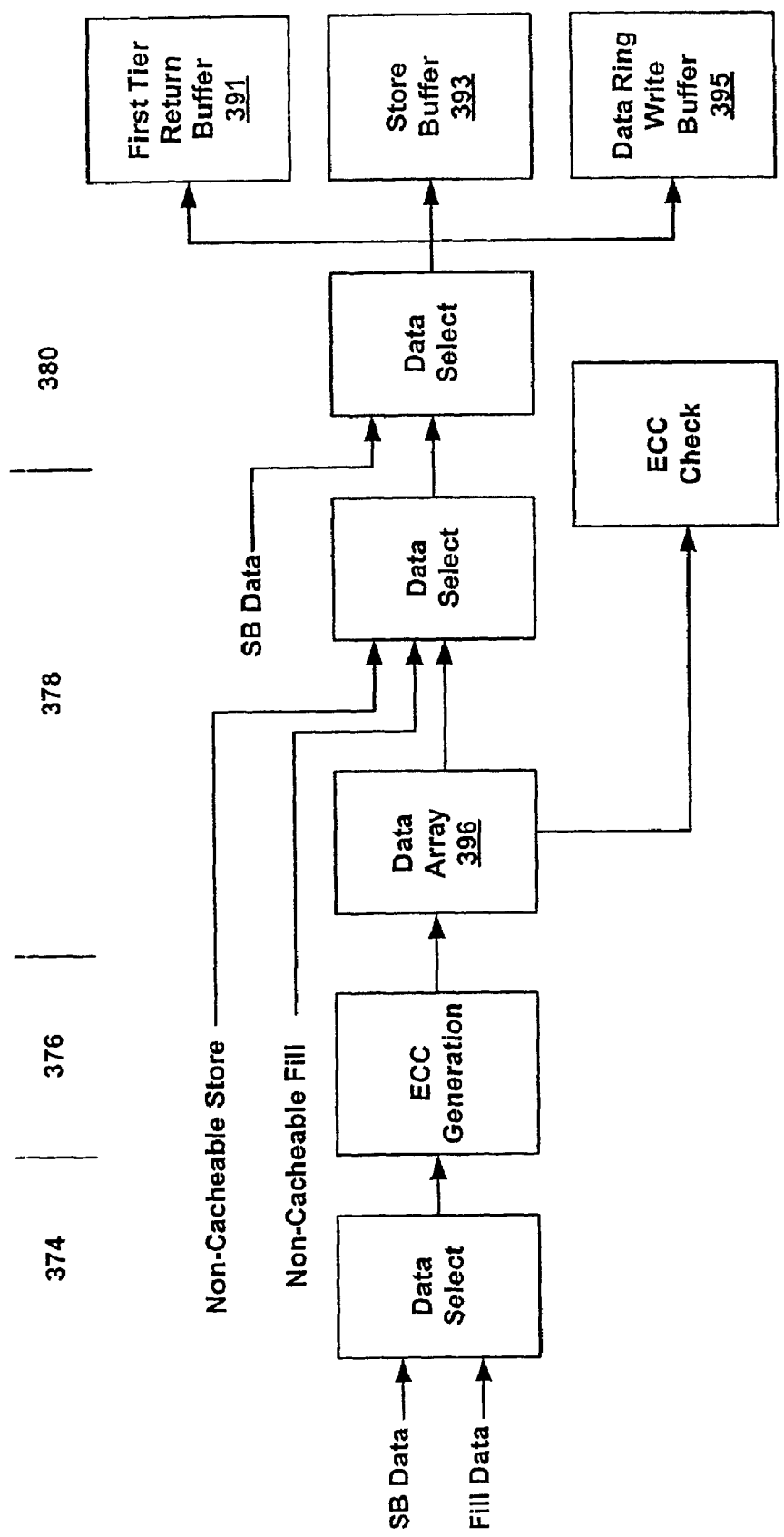
FIG. 7 illustrates further details of the second tier pipeline shown in FIG. 6.

FIG. 7 illustrates the pipeline stage operations employed by cache 80 to transfer the cache line in a store buffer to data array 396 and first tier return buffer 393. This process occurs in parallel with the above-described pipeline stages. In stage 374, cache 80 selects between pending data array writes from store buffer 393 and data ring 20 via Fill requests. In one embodiment, Fill requests take priority. In one such embodiment, load accesses to data array 396 have priority over writes from store buffer 393. In alternate embodiments, different priorities are assigned.

In stage 376, cache 80 generates an ECC checksum for the data selected in stage 374. In stage 378, cache 80 stores the modified store buffer data in the cache line corresponding to the first tier request's Address field. Cache 80 performs an ECC check between stages 378 and 380. Cache 80 then passes the store buffer data to first return buffer 391 in stage 380 for return to the first tier cache.

If the hit request is a pre-fetch, cache 80 operates the same as explained above for a load.

Processing First Tier Request Misses: If the missed request's Opcode field calls for a non-cacheable load, cache 80 forwards the missed request's descriptor to read ERQ 392. Read ERQ forwards the request descriptor to global snoop controller 22, which initiates retrieval of the requested data from main memory 26 by EBL 24.

If the missed request's Opcode field calls for a cacheable load, cache 80 performs as described above for a non-cacheable load with the following modifications. Global snoop controller 22 first initiates retrieval of the requested data from other clusters by issuing a snoop-share request on snoop ring 21. If the snoop request does not return the desired data, then global snoop controller 22 initiates retrieval from main memory 26 via EBL 24. Cache 80 also performs an eviction procedure. In the eviction procedure, cache 80 selects a location in the data array for a cache line of data containing the requested memory location. If the selected data array location contains data that has not been modified, cache 80 overwrites the selected location when the requested data is eventually returned on data ring 20.

If the selected data array location has been modified, cache 80 writes the cache line back to main memory 26 using write ERQ 394 and data ring 20. Cache 80 submits a request descriptor to write ERQ 394 in stage 376. The request descriptor is in the format of a first tier descriptor. Write ERQ 394 forwards the descriptor to global snoop controller 22. Snoop controller 22 instructs external bus logic 24 to capture the cache line off data ring 20 and transfer it to main memory 26. Global snoop controller 22 provides external bus logic 24 with descriptor information that enables logic 24 to recognize the cache line on data ring 20. In one embodiment, this descriptor includes the above-described information found in a snoop request descriptor.

Cache 80 accesses the selected cache line in data array 396, as described above, and forwards the line to data ring write buffer 395 in stages 376 through 380 (FIG. 6). Data ring write buffer 395 is coupled to provide the cache line on data ring 20. In one embodiment, cache 80 includes 4 data ring write buffers. Cache 80 sets the data ring header information for two 32 byte payload transfers as follows: 1) Validity—valid; 2) Cluster—External Bus Logic 24; 3) Memory Request Indicator—corresponding to the request sent to write ERQ 394; 4) MESI—Invalid; and 5) Transfer Done—set to "not done" for the first 32 byte transfer and "done" for the second 32 byte transfer. The header information enables EBL 24 to capture the cache line off data ring 20 and transfer it to main memory 26.

Cache 80 performs an extra operation if a store has been performed on the evicted cache line and the store buffer data has not been written to the data array 396. In this instance, cache 80 utilizes the data selection circuitry from stage 380 (FIG. 7) to transfer the data directly from store buffer 393 to data ring write buffer 395.

If the missed request's Opcode field calls for a non-cacheable store, cache 80 forwards the request to write ERQ 394 in stage 376 for submission to global snoop controller 22. Global snoop controller 22 provides a main memory write request to external bus logic 24, as described above. In stage 378 (FIG. 7), cache controller 80 selects the data from the non-cacheable store operation. In stage 380, cache 80 forwards the data to data ring write buffer 395. Cache 80 sets the data ring header as follows for two 32 byte payload transfers: 1) Validity—valid; 2) Cluster—External Bus Logic 24; 3) Memory Request—corresponding to the request sent to write ERQ 394; 4) MESI—Invalid; and 5) Transfer Done—set to "not done" for the first 32 byte transfer and "done" for the second 32 byte transfer.

If the missed request's Opcode field calls for a cacheable store, cache 80 performs the same operation as explained above for a missed cacheable load. This is because cache 80 performs stores using a read-modify-write operation. In one embodiment, snoop controller 22 issues a snoop-own request in response to the read ERQ descriptor for cache 80.

If the missed request's Opcode field calls for a pre-fetch, cache 80 performs the same operation as explained above for a missed cacheable load.

Processing First Tier Requests for Store-Create Operations: When a request's Opcode field calls for a store-create operation, cache 80 performs an address match in storage 374. If there is not a match, cache 80 forwards the request to global snoop controller 22 through read ERQ 392 in stage 376. Global snoop controller 22 responds by issuing a snoop-kill request on snoop ring 21. The snoop-kill request instructs all other clusters to relinquish control of the identified memory location. Second tier cache responses to snoop-kill requests will be explained below.

If cache 80 discovers an address match in stage 374, cache 80 determines whether the matching cache line has an Exclusive or Modified MESI state. In either of these cases, cache 80 takes no further action. If the status is Shared, then cache 80 forwards the request to snoop controller 22 as described above for the non-matching case.

Processing Snoop Request Hits: If the snoop request Opcode field calls for an own operation, cache 80 relinquishes ownership of the addressed cache line and transfers the line's contents onto data ring 20. Prior to transferring the cache line, cache 80 updates the line, if necessary.

Cache 80 accesses data array 396 in stage 378 (FIG. 6) to retrieve the contents of the cache line containing the desired data—the Address field in the snoop request descriptor identifies the desired cache line. This access operates the same as described above for first tier cacheable load hits. Cache 80 performs ECC checking and correction is stages 378 and 380 and writes the cache line to data ring write buffer 395. Alternatively, if the retrieved cache line buffer needs to be updated, cache 80 transfers the contents of store buffer 393 to data ring write buffer 395 (FIG. 7).

Cache 80 provides the following header information to the data ring write buffer along with the cache line: 1) Validity—valid; 2) Cluster—same as in the snoop request; 3) Memory Request—same as in the snoop request; 4) MESI—Exclusive (if the data was never modified while in cache 80) or Modified (if the data was modified while in cache 80); and 5) Transfer Done—"not done", except for the header connected with the final payload for the cache line. Cache 80 then transfers the contents of data ring write buffer 395 onto data ring 20.

Cache 80 also provides global snoop controller 22 with an acknowledgement that cache 80 serviced the snoop request. In one embodiment, cache 80 performs the acknowledgement via the point-to-point link with snoop controller 22.

If the snoop request Opcode field calls for a share operation, cache 80 performs the same as described above for a read operation with the following exceptions. Cache 80 does not necessarily relinquish ownership. Cache 80 sets the MESI field to Shared if the requested cache line's current MESI status is Exclusive or Shared. However, if the current MESI status for the requested cache line is Modified, then cache 80 sets the MESI data ring field to Modified and relinquishes ownership of the cache line. Cache 80 also provides global snoop controller 22 with an acknowledgement that cache 80 serviced the snoop request, as described above.

If the snoop request Opcode field calls for a kill operation, cache 80 relinquishes ownership of the addressed cache line and does not transfer the line's contents onto data ring 20. Cache 80 also provides global snoop controller 22 with an acknowledgement that cache 80 serviced the snoop request, as described above.

Processing Snoop Request Misses: If the snoop request is a miss, cache 80 merely provides an acknowledgement to global snoop controller 22 that cache 80 serviced the snoop request.

Processing Fill Requests With Cluster Matches: If a Fill request has a cluster match, cache 80 retrieves the original request that led to the incoming data ring Fill request. The original request is contained in either read ERQ 392 or write ERQ 394. The Memory Request field from the incoming data ring header identifies the corresponding entry in read ERQ 392 or write ERQ 394. Cache 80 employs the Address and Opcode fields from the original request in performing further processing.

If the original request's Opcode field calls for a cacheable load, cache 80 transfers the incoming data ring payload data into data array 396 and first tier return buffer 391. In stage 374, (FIG. 7) cache 80 selects the Fill Data, which is the payload from data ring 20. In stage 376, cache 80 performs ECC generation. In stage 378, cache 80 accesses data array 396 and writes the Fill Data into the addressed cache line. Cache 80 performs the data array access based on the Address field in the original request descriptor. As explained above, cache 80 previously assigned the Address field address a location in data array 396 before forwarding the original request to global snoop controller 22. The data array access also places the Fill Data into first tier return buffer 391. Cache 80 performs ECC checking in stages 378 and 380 and loads first tier return buffer 391.

If the original request's Opcode field calls for a non-cacheable load, cache 80 selects Fill Data in stage 378 (FIG. 7). Cache 80 then forwards the Fill Data to first tier return buffer 391 in stage 380. First tier return buffer 391 passes the payload data back to the first tier cache requesting the load.

If the original request's Opcode field calls for a cacheable store, cache 80 responds as follows in one embodiment. First, cache 80 places the Fill Data in data array 396—cache 80 performs the same operations described above for a response to a cacheable load Fill request. Next, cache 80 performs a store using the data originally supplied by the requesting compute engine—cache 80 performs the same operations as described above for a response to a cacheable store first tier request with a hit.

In an alternate embodiment, cache 80 stores the data originally provided by the requesting compute engine in store buffer 393. Cache 80 then compares the store buffer data with the Fill Data—modifying store buffer 393 to include Fill Data in bit positions not targeted for new data storage in the store request. Cache 80 writes the contents of store buffer 393 to data array 396 when there is an idle cycle or another access to store buffer 393 is necessary, whichever occurs first.

If the original request's Opcode field calls for a pre-fetch, cache 80 responds the same as for a cacheable load Fill request.

Processing Fill Requests Without Cluster Matches: If a Fill request does not have a cluster match, cache 80 merely places the incoming data ring header and payload back onto data ring 20.

Cache 80 also manages snoop request queue 390 and data cache request queues 382, 384, 386, and 388. Once a request from snoop request queue 390 or data cache request queue 382, 384, 386 or 388 is sent to read ERQ 392 or write ERQ 394, cache 80 invalidates the request to make room for more requests. Once a read ERQ request or write ERQ request is serviced, cache 80 removes the request from the ERQ. Cache 80 removes a request by setting the request's Validity field to an invalid status.

In one embodiment, cache 80 also includes a sleep mode to aid in queue management. Cache 80 employs sleep mode when either read ERQ 392 or write ERQ 394 is full and cannot accept another request from a first tier data cache request queue or snoop request queue. Instead of refusing service to a request or flushing the cache pipeline, cache 80 places the first tier or snoop request in a sleep mode by setting the Sleep field in the request descriptor. When read ERQ 392 or write ERQ 394 can service the request, cache 80 removes the request from sleep mode and allows it to be reissued in the pipeline.

In another embodiment of the invention, the scheduler in cache 80 filters the order of servicing first tier data cache requests to ensure that data is not corrupted. For example, CPU 60 may issue a load instruction for a memory location, followed by a store for the same location. The load needs to occur first to avoid loading improper data. Due to either the CPU's pipeline or a reprioritization by cache 80, the order of the load and store commands in the above example can become reversed.

Processors traditionally resolve the dilemma in the above example by issuing no instructions until the load in the above example is completed. This solution, however, has the drawback of slowing processing speed—instruction cycles go by without the CPU performing any instructions.

In one embodiment of the present invention, the prioritization filter of cache 80 overcomes the drawback of the traditional processor solution. Cache 80 allows memory requests to be reordered, but no request is allowed to precede another request upon which it is dependent. For example, a set of requests calls for a load from location A, a store to location A after the load from A, and a load from memory location B. The store to A is dependent on the load from A being performed first. Otherwise, the store to A corrupts the load from A. The load from A and load from B are not dependent on other instructions preceding them. Cache 80 allows the load from A and load from B to be performed in any order, but the store to A is not allowed to proceed until the load from A is complete. This allows cache 80 to service the load from B, while waiting for the load from A to complete. No processing time needs to go idle.

Cache 80 implements the prioritization filter using read ERQ 392, write ERQ 394, and the Dependency field in a first tier data cache request descriptor. The Dependency field identifies requests in the first tier data cache request queue that must precede the dependent request. Cache 80 does not select the dependent request from the data cache request queue until all the dependent requests have been serviced. Cache 80 recognizes a request as serviced once the request's Validity field is set to an invalid state, as described above.

C. Global Snoop Controller

Global snoop controller 22 responds to requests issued by clusters 12, 14, 16, and 18. As demonstrated above, these requests come from read ERQ and write ERQ buffers in second tier caches. The requests instruct global snoop controller 22 to either issue a snoop request or an access to main memory. Additionally, snoop controller 22 converts an own or share snoop request into a main memory access request to EBL 24 when no cluster performs a requested memory transfer. Snoop controller 22 uses the above-described acknowledgements provided by the clusters' second tier caches to keep track of memory transfers performed by clusters.

D. Application Processing

Figure 8A:
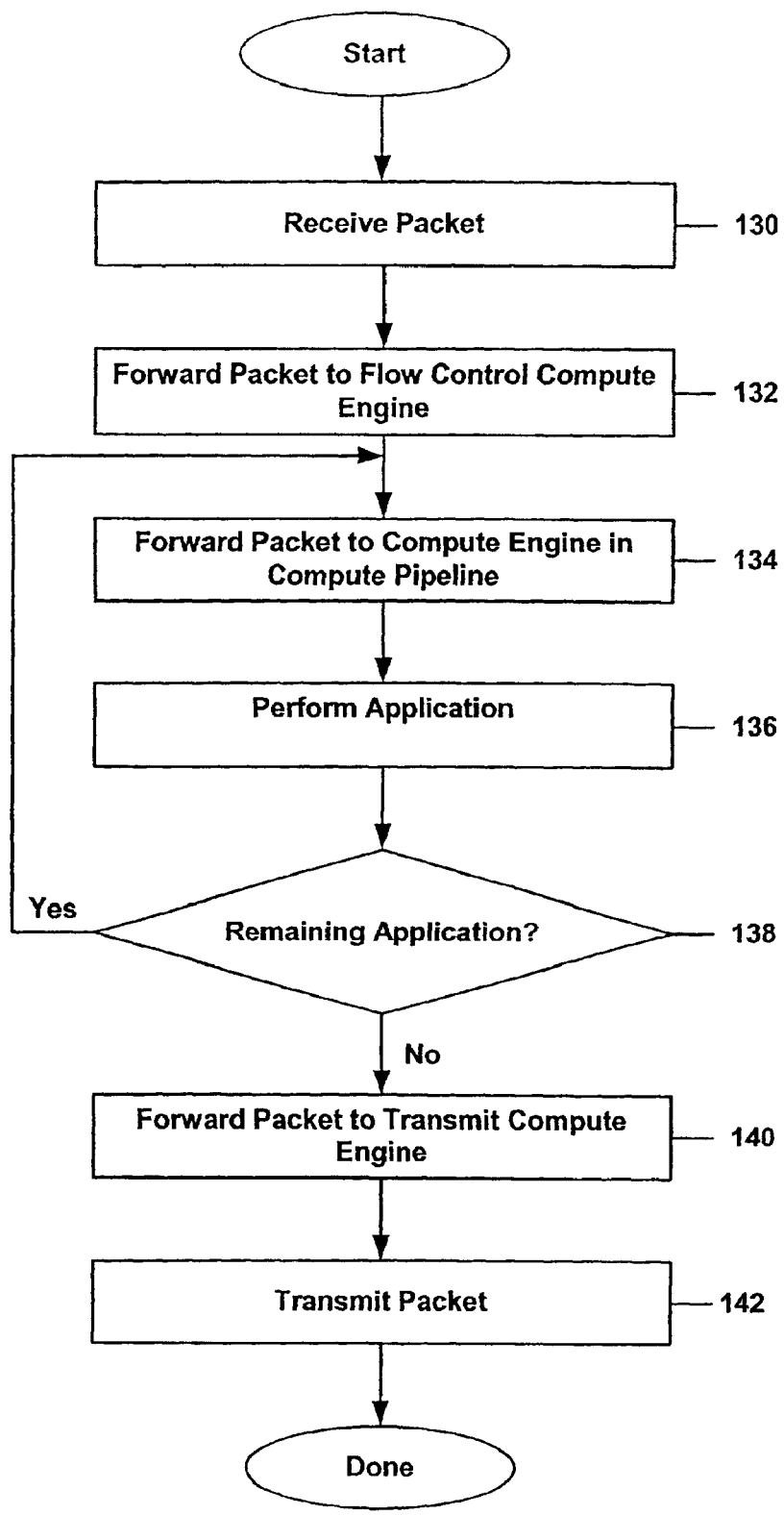
FIG. 8a illustrates a series of operations for processing network packets in one embodiment of the present invention.

FIG. 8*a* illustrates a process employed by MPU 10 for executing applications in one embodiment of the present invention. FIG. 8*a* illustrates a process in which MPU 10 is employed in an application-based router in a communications network. Generally, an application-based router identifies and executes applications that need to be performed on data packets received from a communication medium. Once the applications are performed for a packet, the router determines the next network destination for the packet and transfers the packet over the communications medium.

MPU 10 receives a data packet from a communications medium coupled to MPU 10 (step 130). In one embodiment, MPU 10 is coupled to an IEEE 802.3 compliant network running Gigabit Ethernet. In other embodiments, MPU 10 is coupled to different networks and in some instances operates as a component in a wide area network. A compute engine in MPU 10, such as compute engine 50 in FIG. 4, is responsible for receiving packets. In such an embodiment, coprocessor 62 includes application specific circuitry coupled to the communications medium for receiving packets. Coprocessor 62 also includes application specific circuitry for storing the packets in data cache 52 and second tier cache 80. The reception process and related coprocessor circuitry will be described below in greater detail.

Compute engine 50 transfers ownership of received packets to a flow control compute engine, such as compute engine 86, 88, or 90 in FIG. 4 (step 132). Compute engine 50 transfers packet ownership by placing an entry in the application queue of the flow control compute engine.

The flow control compute engine forwards ownership of each packet to a compute engine in a pipeline set of compute engines (step 134). The pipeline set of compute engines is a set of compute engines that will combine to perform applications required for the forwarded packet. The flow control compute engine determines the appropriate pipeline by examining the packet to identify the applications to be performed. The flow control compute engine transfers ownership to a pipeline capable of performing the required applications.

In one embodiment of the present invention, the flow control compute engine uses the projected speed of processing applications as a consideration in selecting a pipeline. Some packets require significantly more processing than others. A limited number of pipelines are designated to receive such packets, in order to avoid these packets consuming all of the MPU processing resources.

After the flow control compute engine assigns the packet to a pipeline (step 134), a pipeline compute engine performs a required application for the assigned packet (step 136). Once the application is completed, the pipeline compute engine determines whether any applications still need to be performed (step 138). If more applications remain, the pipeline compute engine forwards ownership of the packet to another compute engine in the pipeline (step 134) and the above-described process is repeated. This enables multiple services to be performed by a single MPU. If no applications remain, the pipeline compute engine forwards ownership of the packet to a transmit compute engine (step 140).

The transmit compute engine transmits the data packet to a new destination of the network, via the communications medium (step 142). In one such embodiment, the transmit compute engine includes a coprocessor with application specific circuitry for transmitting packets. The coprocessor also includes application specific circuitry for retrieving the packets from memory. The transmission process and related coprocessor circuitry will be described below in greater detail.

Figure 8B:
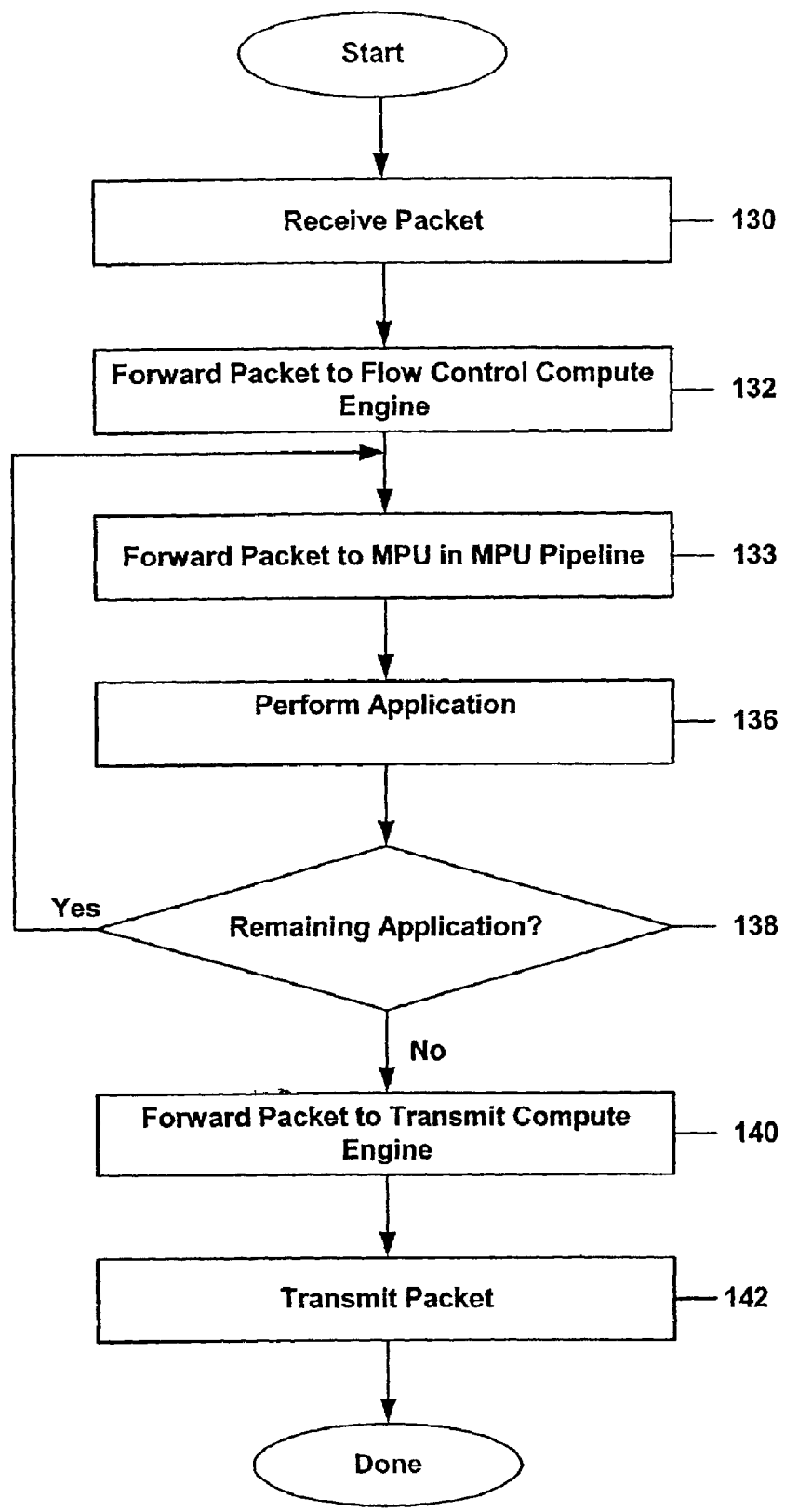
FIG. 8b illustrates a series of operations for processing network packets in an alternate embodiment of the present invention.

FIG. 8*b* illustrates a process for excecuting applications in an alternate embodiment of the present invention. This embodiment employs multiple multi-processor units, such as MPU 10. In this embodiment, the multi-processor units are coupled together over a communications medium. In one version, the multi-processor units are coupled together by cross-bar switches, such as the cross-bar switch disclosed in U.S. patent application Ser. No. 09/900,514, entitled Cross-Bar Switch, filed on Jul. 6, 2001, and hereby incorporated by reference.

In the embodiment shown in FIG. 8*b*, steps with the same reference numbers as steps in FIG. 8*a* operate as described for FIG. 8*a*. The difference is that packets are assigned to a pipeline set of multi-processor units, instead of a pipeline set of compute engines. Each multi-processor unit in a pipeline transfers packets to the next multi-processor unit in the pipeline via the communications medium (step 133). In one such embodiment, each multi-processor unit has a compute engine coprocessor with specialized circuitry for performing communications medium receptions and transmissions, as well as exchanging data with cache memory. In one version of the FIG. 8*b* process, each multi-processor unit performs a dedicated application. In alternate embodiments, a multi-processor unit performs multiple applications.

Although MPU 10 has been described above with reference to a router application, MPU 10 can be employed in many other applications. One example is video processing. In such an application, packet reception step 130 is replaced with a different operation that assigns video processing applications to MPU 10. Similarly, packet transmission step 142 is replaced with an operation that delivers processed video data.

E. Coprocessor

As described above, MPU 10 employs coprocessors in cluster compute engines to expedite application processing. The following sets forth coprocessor implementations employed in one set of embodiments of the present invention. One of ordinary skill will recognize that alternate coprocessor implementations can also be employed in an MPU in accordance with the present invention.

1. Coprocessor Architecture and Operation

FIG. 9*a* illustrates a coprocessor in one embodiment of the present invention, such as coprocessor 62 from FIGS. 3 and 4. Coprocessor 62 includes sequencers 150 and 152, each coupled to CPU 60, arbiter 176, and a set of application engines. The application engines coupled to sequencer 150 include streaming input engine 154, streaming output engine 162, and other application engines 156, 158, and 160. The application engines coupled to sequencer 152 include streaming input engine 164, streaming output engine 172, and other application engines 166, 168, and 170. In alternate embodiments any number of application engines are coupled to sequencers 150 and 152.

Sequencers 150 and 152 direct the operation of their respective coupled engines in response to instructions received from CPU 60. In one embodiment, sequencers 150 and 152 are micro-code based sequencers, executing micro-code routines in response to instructions from CPU 60. Sequencers 150 and 152 provide output signals and instructions that control their respectively coupled engines in response to these routines. Sequencers 150 and 152 also respond to signals and data provided by their respectively coupled engines. Sequencers 150 and 152 additionally perform application processing internally in response to CPU 60 instructions.

Streaming input engines 154 and 164 each couple coprocessor 62 to data cache 52 for retrieving data. Streaming output engines 162 and 172 each couple coprocessor 62 to data cache 52 for storing data to memory. Arbiter 176 couples streaming input engines 154 and 164, and streaming output engines 162 and 172, and sequencers 150 and 152 to data cache 52. In one embodiment, arbiter 176 receives and multiplexes the data paths for the entities on coprocessor 62. Arbiter 176 ensures that only one entity at a time receives access to the interface lines between coprocessor 62 and data cache 52. Micro-MMU 174 is coupled to arbiter 176 to provide internal conversions between virtual and physical addresses. In one embodiment of the present invention, arbiter 176 performs a round-robin arbitration scheme. Mirco-MMU 174 contains the above-referenced internal translation buffers for coprocessor 62 and provides coprocessor 62's interface to MMU 58 (FIG. 3) or 82 (FIG. 4).

Application engines 156, 158, 160, 166, 168, and 170 each perform a data processing application relevant to the job being performed by MPU 10. For example, when MPU 10 is employed in one embodiment as an application based router, application engines 156, 158, 160, 166, 168, and 170 each perform one of the following: 1) data string copies; 2) polynomial hashing; 3) pattern searching; 4) RSA modulo exponentiation; 5) receiving data packets from a communications medium; 6) transmitting data packets onto a communications medium; and 7) data encryption and decryption.

Application engines 156, 158, and 160 are coupled to provide data to streaming output engine 162 and receive data from streaming input engine 154. Application engines 166, 168, and 170 are coupled to provide data to streaming output engine 172 and receive data from streaming input engine 164.

Figure 9B:
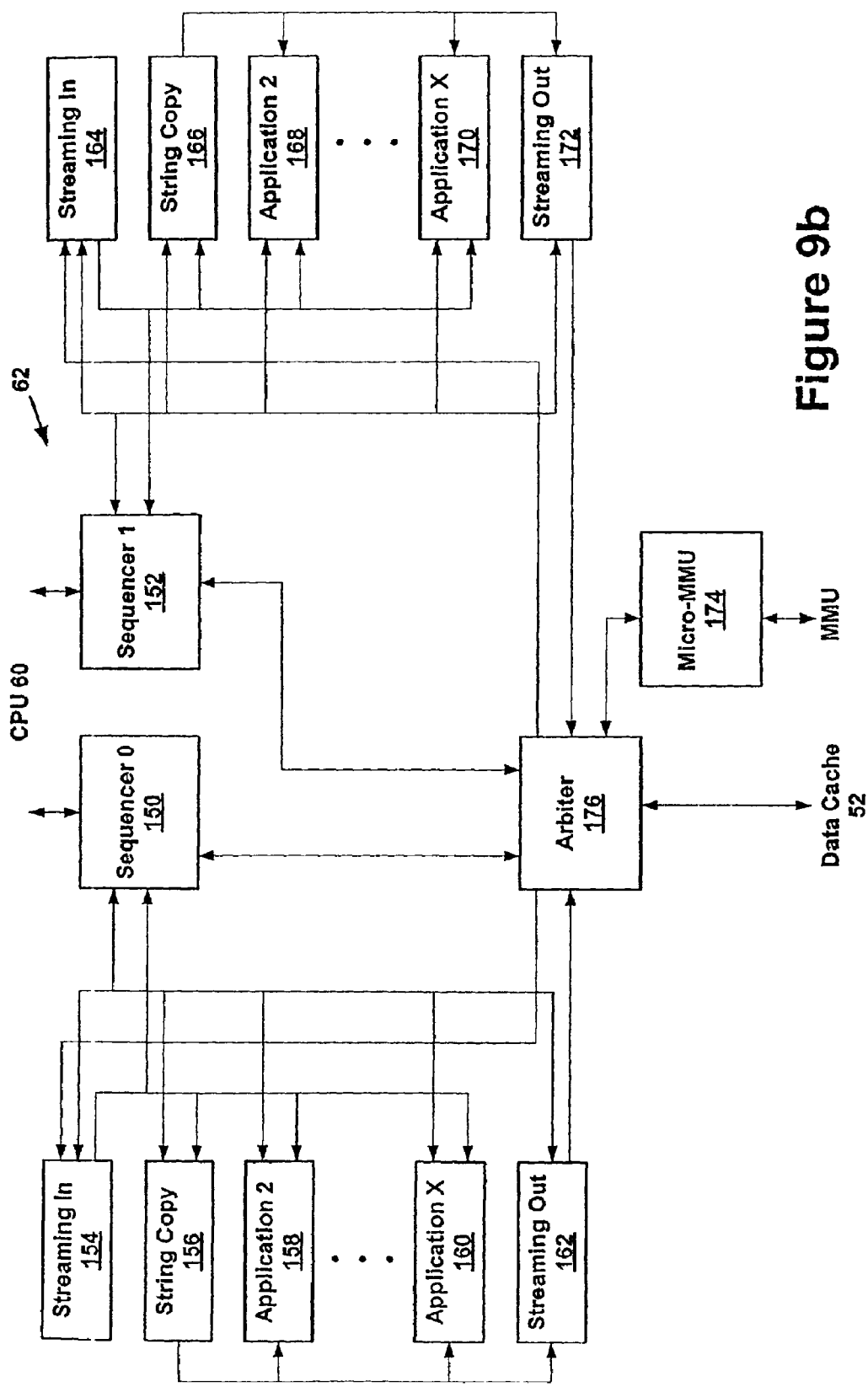
Figure 9C:
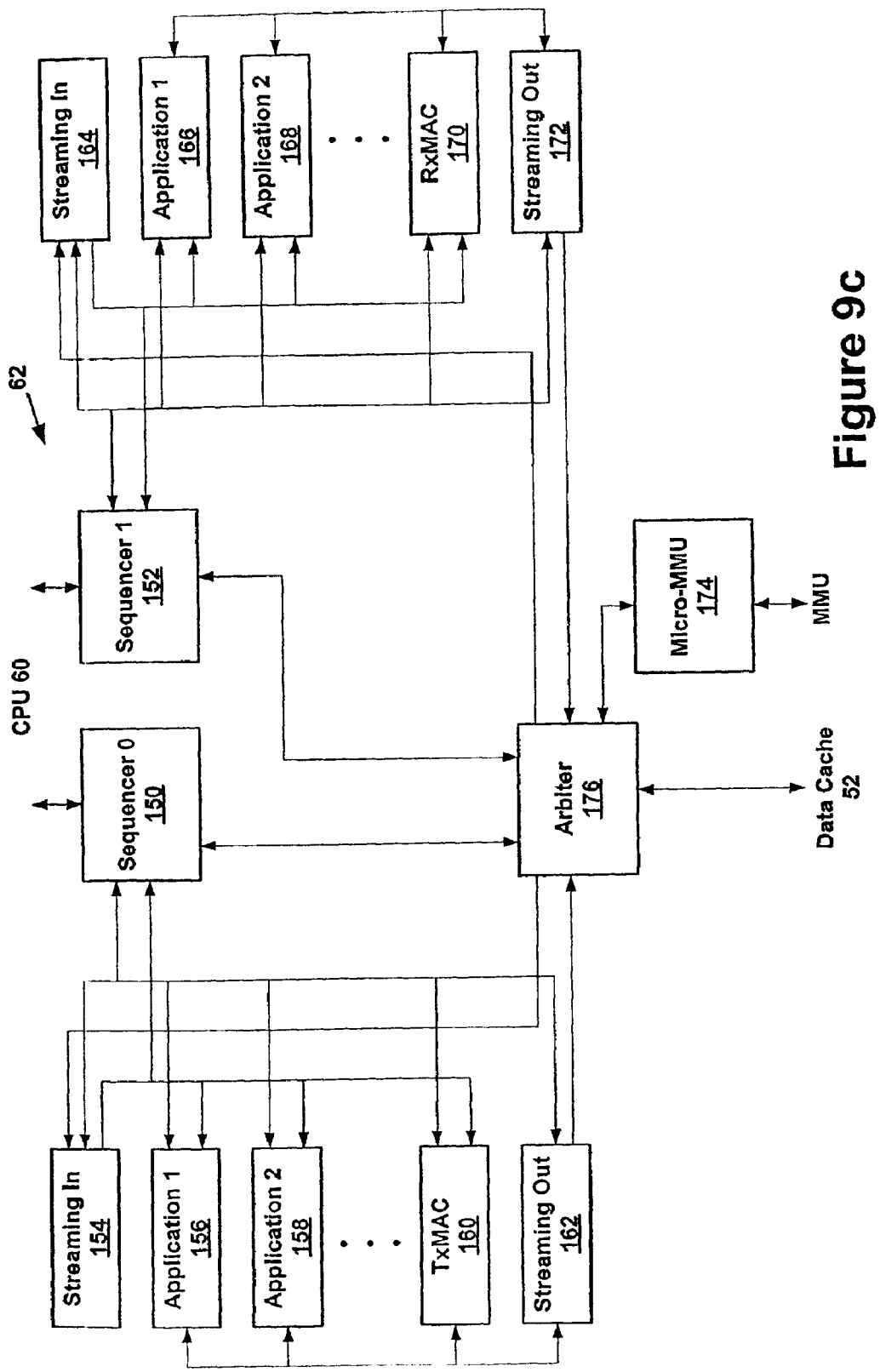

FIG. 9b shows an embodiment of coprocessor 62 with application engines 156 and 166 designed to perform the data string copy application. In this embodiment, engines 156 and 166 are coupled to provide string copy output data to engine sets 158, 160, and 162, and 168, 170, and 172, respectively. FIG. 9c shows an embodiment of coprocessor 62, where engine 160 is a transmission media access controller ("TxMAC") and engine 170 is a reception media access controller (RxMAC"). TxMAC 160 transmits packets onto a communications medium, and RxMAC 170 receives packets from a communications medium. These two engines will be described in greater detail below.

One advantage of the embodiment of coprocessor 62 shown in FIGS. 9a–9c is the modularity. Coprocessor 62 can easily be customized to accommodate many different applications. For example, in one embodiment only one compute engine receives and transmits network packets. In this case, only one coprocessor contains an RxMAC and TxMAC, while other coprocessors in MPU 10 are customized with different data processing applications. Coprocessor 62 supports modularity by providing a uniform interface to application engines, except streaming input engines 154 and 164 and streaming output engines 162 and 172.

2. Sequencer

Figure 10:
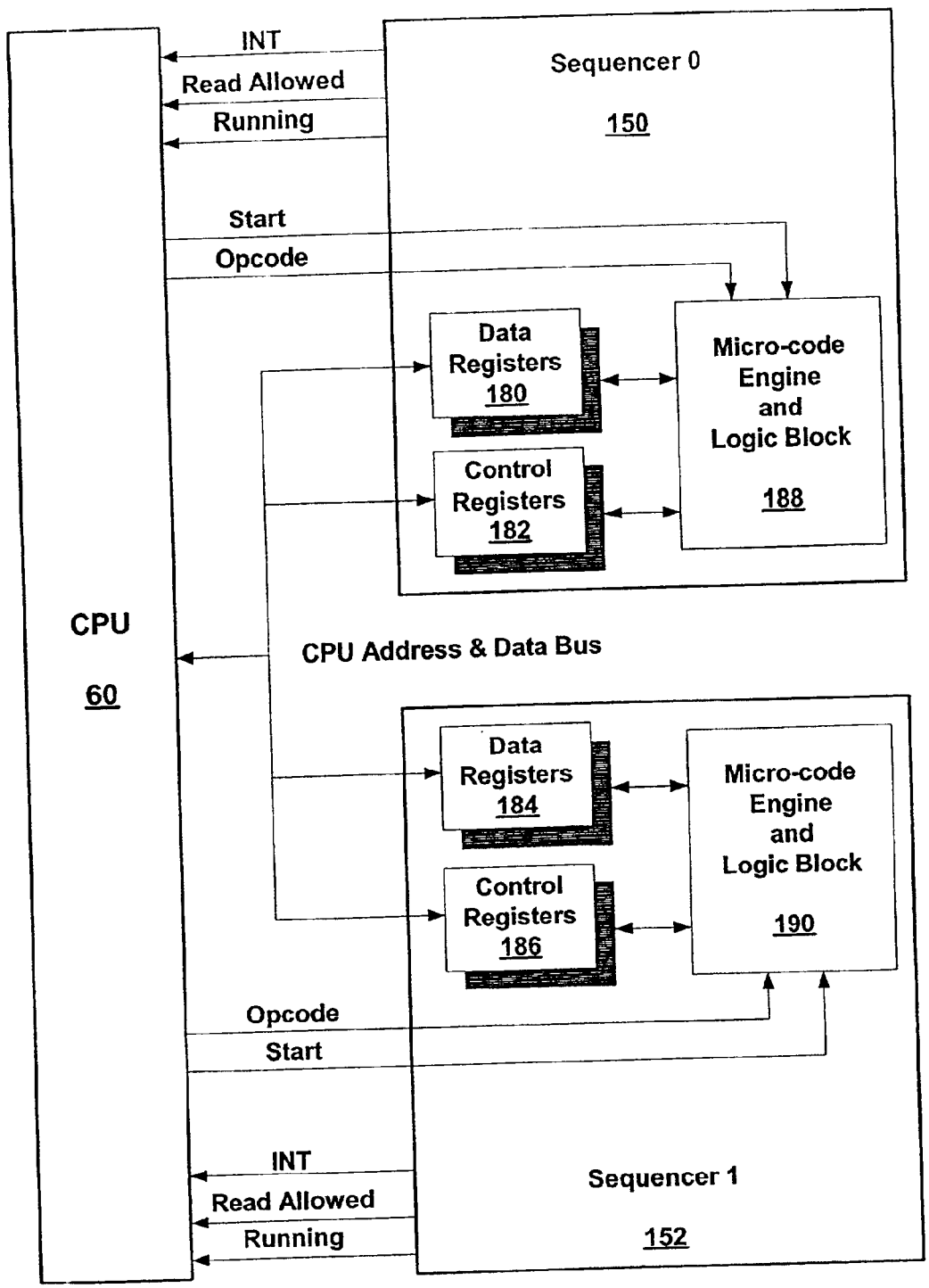
FIG. 10 shows an interface between a CPU and the coprocessors in FIGS. 9a–9c.

FIG. 10 shows an interface between CPU 60 and sequencers 150 and 152 in coprocessor 62 in one embodiment of the present invention. CPU 60 communicates with sequencer 150 and 152 through data registers 180 and 184, respectively, and control registers 182 and 186, respectively. CPU 60 has address lines and data lines coupled to the above-listed registers. Data registers 180 and control registers 182 are each coupled to exchange information with micro-code engine and logic block 188. Block 188 interfaces to the engines in coprocessor 62. Data register 184 and control registers 186 are each coupled to exchange information with micro-code engine and logic block 190. Block 190 interfaces to the engines in coprocessor 62.

CPU 60 is coupled to exchange the following signals with sequencers 150 and 152: 1) Interrupt (INT)—outputs from sequencers 150 and 152 indicating an assigned application is complete; 2) Read Allowed—outputs from sequencers 150 and 152 indicating access to data and control registers is permissible; 3) Running—outputs from sequencers 150 and 152 indicating that an assigned application is complete; 4) Start—outputs from CPU 60 indicating that sequencer operation is to begin; and 5) Opcode—outputs from CPU 60 identifying the set of micro-code instructions for the sequencer to execute after the assertion of Start.

In operation, CPU 60 offloads performance of assigned applications to coprocessor 62. CPU 60 instructs sequencers 150 and 152 by writing instructions and data into respective data registers 180 and 182 and control registers 184 and 186. The instructions forwarded by CPU 60 prompt either sequencer 150 or sequencer 152 to begin executing a routine in the sequencer's micro-code. The executing sequencer either performs the application by running a micro-code routine or instructing an application engine to perform the offloaded application. While the application is running, the sequencer asserts the Running signal, and when the application is done the sequencer asserts the Interrupt signal. This allows CPU 60 to detect and respond to an application's completion either by polling the Running signal or employing interrupt service routines.

Figure 11:
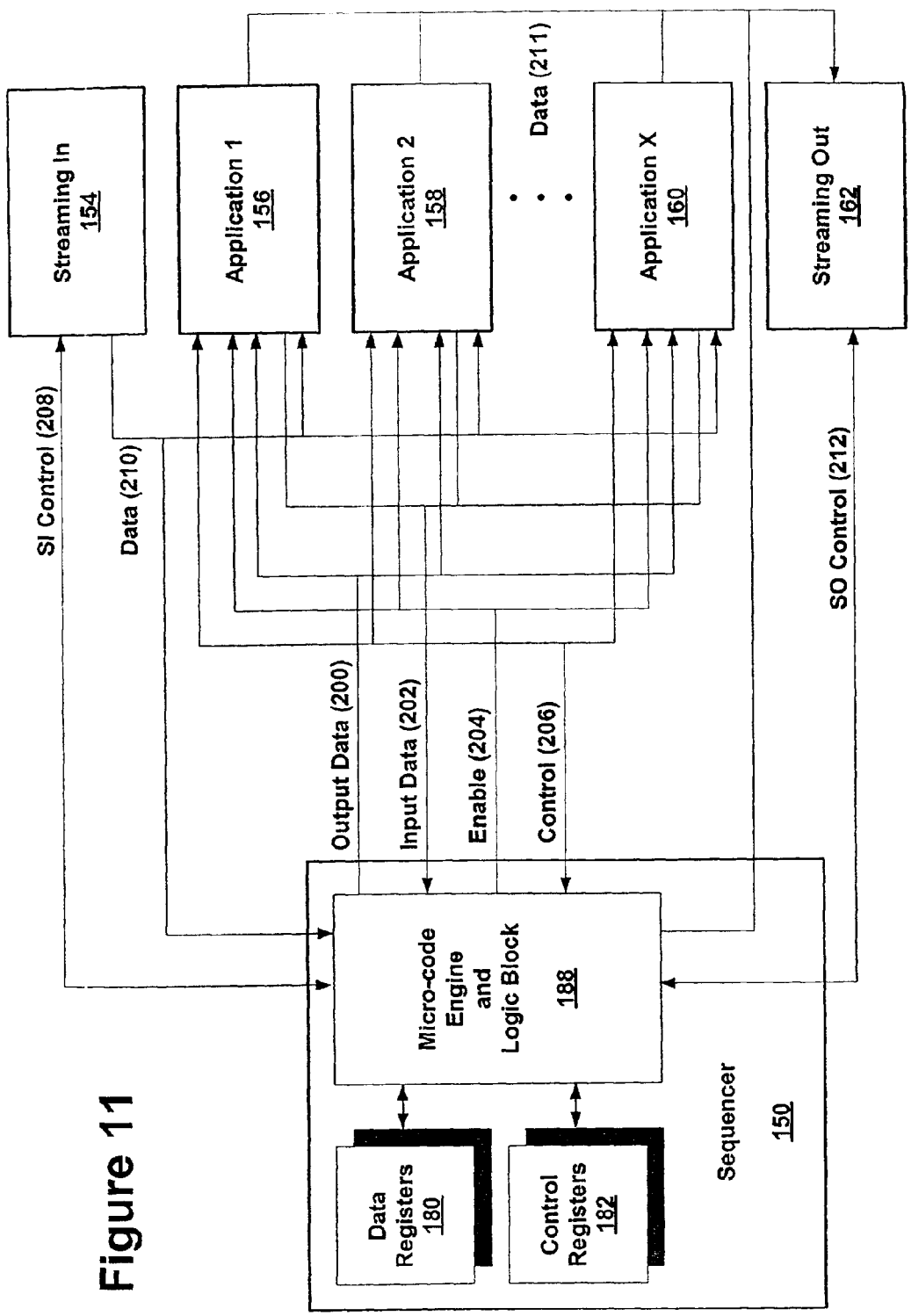
FIG. 11 shows an interface between a sequencer and application engines in the coprocessors in FIGS. 9a–9c.

FIG. 11 shows an interface between sequencer 150 and its related application engines in one embodiment of the present invention. The same interface is employed for sequencer 152.

Output data interface 200 and input data interface 202 of sequencer 150 are coupled to engines 156, 158, and 160. Output data interface 200 provides data to engines 156, 158, and 160, and input data interface 202 retrieves data from engines 156, 158, and 160. In one embodiment, data interfaces 200 and 202 are each 32 bits wide.

Sequencer 150 provides enable output 204 to engines 156, 158, and 160. Enable output 204 indicates which application block is activated. In one embodiment of the present invention, sequencer 150 only activates one application engine at a time. In such an embodiment, application engines 156, 158, and 160 each receive a single bit of enable output 204—assertion of that bit indicates the receiving application engine is activated. In alternate embodiments, multiple application engines are activated at the same time.

Sequencer 150 also includes control interface 206 coupled to application engines 156, 158, and 160. Control interface 206 manages the exchange of data between sequencer 150 and application engines 156, 158, and 160. Control interface 206 supplies the following signals:

1) register read enable—enabling data and control registers on the activated application engine to supply data on input data interface 202;
2) register write enable—enabling data and control registers on the activated application engine to accept data on output data interface 200;
3) register address lines—providing addresses to application engine registers in conjunction with the data and control register enable signals; and
4) arbitrary control signals—providing unique interface signals for each application engine. The sequencer's micro-code programs the arbitrary control bits to operate differently with each application engine to satisfy each engine's unique interface needs.

Once sequencer 150 receives instruction from CPU 60 to carry out an application, sequencer 150 begins executing the micro-code routine supporting that application. In some instances, the micro-code instructions carry out the application without using any application engines. In other instances, the micro-code instructions cause sequencer 150 to employ one or more application engines to carry out an application.

When sequencer 150 employs an application engine, the micro-code instructions cause sequencer 150 to issue an enable signal to the engine on enable interface 204. Following the enable signal, the micro-code directs sequencer 150 to use control interface 206 to initialize and direct the operation of the application engine. Sequencer 150 provides control directions by writing the application engine's control registers and provides necessary data by writing the application engine's data registers. The micro-code also instructs sequencer 150 to retrieve application data from the application engine. An example of the sequencer-application interface will be presented below in the description of RxMAC 170 and TxMAC 160.

Sequencer 150 also includes a streaming input (SI) engine interface 208 and streaming output (SO) engine interface 212. These interfaces couple sequencer 150 to streaming input engine 154 and streaming output engine 162. The operation of these interfaces will be explained in greater detain below.

Streaming input data bus 210 is coupled to sequencer 150, streaming input engine 154, and application engines 156, 158, and 160. Streaming input engine 154 drives bus 210 after retrieving data from memory. In one embodiment, bus 210 is 16 bytes wide. In one such embodiment, sequencer 150 is coupled to retrieve only 4 bytes of data bus 210.

Streaming output bus 211 is coupled to sequencer 150, streaming output engine 162 and application engines 156, 158, and 160. Application engines deliver data to streaming output engine 162 over streaming output bus 211, so streaming output engine 162 can buffer the data to memory. In one embodiment, bus 211 is 16 bytes wide. In one such embodiment, sequencer 150 only drives 4 bytes on data bus 211.

3. Streaming Input Engine

Figure 12:
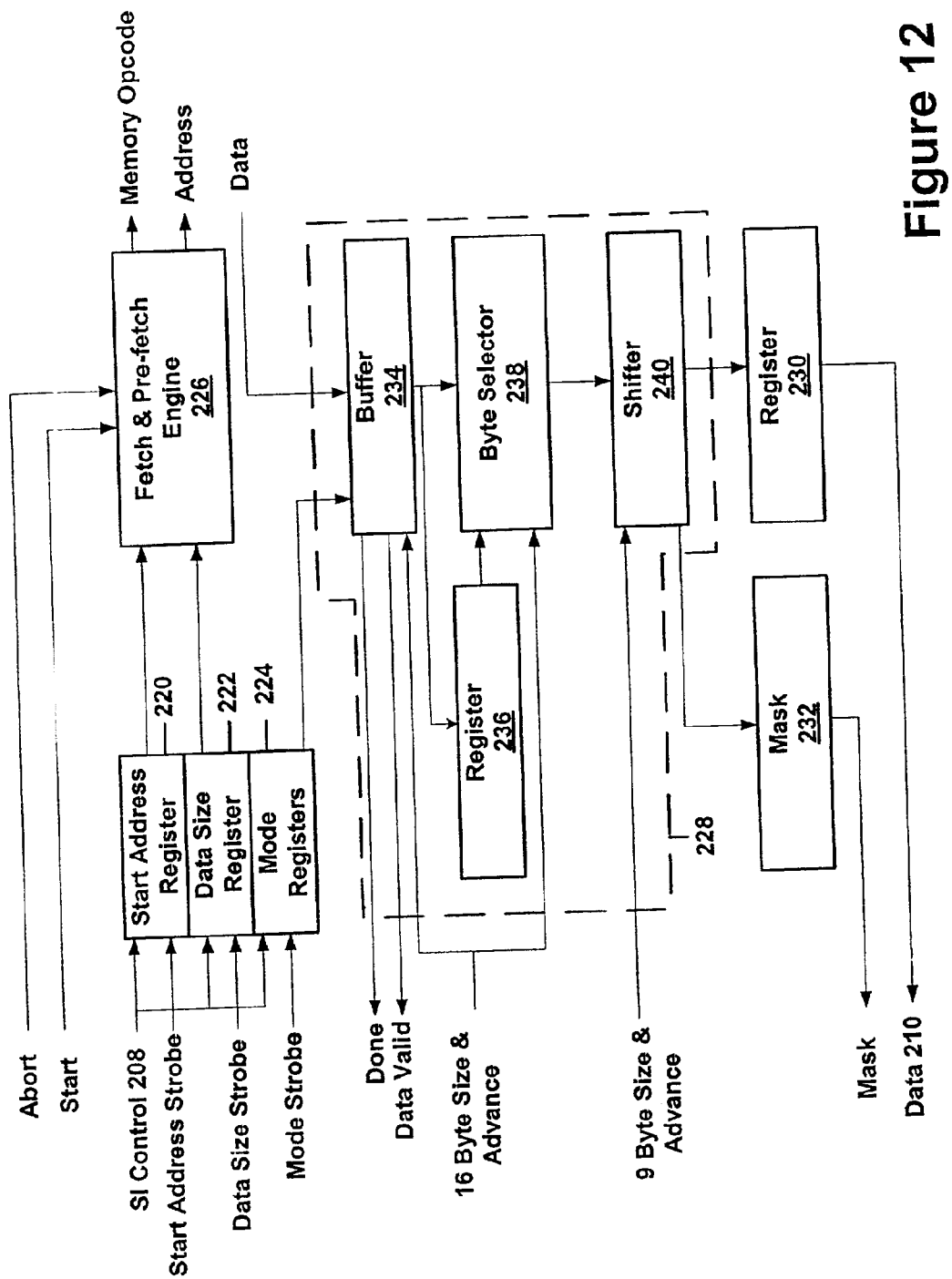
FIG. 12 shows one embodiment of a streaming input engine for the coprocessors shown in FIGS. 9a–9c.

FIG. 12 shows streaming input engine 154 in one embodiment of the present invention. Streaming input engine 154 retrieves data from memory in MPU 10 at the direction of sequencer 150. Sequencer 150 provides streaming input engine 154 with a start address and data size value for the block of memory to be retrieved. Streaming input engine 154 responds by retrieving the identified block of memory and providing it on streaming data bus 210 in coprocessor 62. Streaming input engine 154 provides data in programmable word sizes on bus 210, in response to signals on SI control interface 208.

Fetch and pre-fetch engine 226 provides instructions (Memory Opcode) and addresses for retrieving data from memory. Alignment circuit 228 receives the addressed data and converts the format of the data into the alignment desired on streaming data bus 210. In one embodiment, engine 226 and alignment circuit 228 are coupled to first tier data cache 52 through arbiter 176 (FIGS. 9a–9c).

Alignment circuit 228 provides the realigned data to register 230, which forwards the data to data bus 210. Mask register 232 provides a mask value identifying the output bytes of register 230 that are valid. In one embodiment, fetch engine 226 addresses 16 byte words in memory, and streaming input engine 154 can be programmed to provide words with sizes of either: 0, 1, 2, 3, 4, 5, 6, 7, 8, or 16 bytes.

Streaming input engine 154 includes configuration registers 220, 222, and 224 for receiving configuration data from sequencer 150. Registers 220, 222, and 224 are coupled to data signals on SI control interface 208 to receive a start address, data size, and mode identifier, respectively. Registers 220, 222, and 224 are also coupled to receive the following control strobes from sequencer 150 via SI control interface 208: 1) start address strobe—coupled to start address register 220; 2) data size strobe—coupled to data size register 222; and 3) mode strobe—coupled to mode register 224. Registers 220, 222, and 224 each capture the data on output data interface 200 when sequencer 150 asserts their respective strobes.

In operation, fetch engine 226 fetches the number of bytes identified in data size register 222, beginning at the start address in register 220. In one embodiment, fetch engine 226 includes a pre-fetch operation to increase the efficiency of memory fetches. Fetch engine 226 issues pre-fetch instructions prior to addressing memory. In response to the pre-fetch instructions, MPU 10 begins the process of mapping the memory block being accessed by fetch engine 226 into data cache 52 (See FIGS. 3 and 4).

In one embodiment, fetch engine 226 calls for MPU 10 to pre-fetch the first three 64 byte cache lines of the desired memory block. Next, fetch engine 226 issues load instructions for the first 64 byte cache line of the desired memory block. Before each subsequent load instruction for the desired memory block, fetch engine 226 issues pre-fetch instructions for the two cache lines following the previously pre-fetched lines. If the desired memory block is less than three cache lines, fetch engine 226 only issues pre-fetch instructions for the number of lines being sought. Ideally, the pre-fetch operations will result in data being available in data cache 52 when fetch engine 226 issues load instructions.

SI control interface 208 includes the following additional signals: 1) abort—asserted by sequencer 150 to halt a memory retrieval operation; 2) start—asserted by sequencer 150 to begin a memory retrieval operations; 3) done—asserted by streaming input engine 154 when the streaming input engine is drained of all valid data; 4) Data Valid—asserted by streaming input engine 154 to indicate engine 154 is providing valid data on data bus 210; 5) 16 Byte Size & Advance—asserted by sequencer 150 to call for a 16 byte data output on data bus 210; and 6) 9 Byte Size & Advance—asserted by sequencer 150 to call for either 0, 1, 2, 3, 4, 5, 6, 7, or 8 byte data output on data bus 210.

In one embodiment, alignment circuit 228 includes buffer 234, byte selector 238, register 236, and shifter 240. Buffer 234 is coupled to receive 16 byte data words from data cache 52 through arbiter 176. Buffer 234 supplies data words on its output in the order the data words were received. Register 236 is coupled to receive 16 byte data words from buffer 234. Register 236 stores the data word that resided on the output of buffer 234 prior to the word stored in register 236.

Byte selector 238 is coupled to receive the data word stored in register 236 and the data word on the output of buffer 234. Byte selector 238 converts the 32 byte input into a 24 byte output, which is coupled to shifter 240. The 24 bytes follow the byte last provided to register 230. Register 236 loads the output of buffer 234 and buffer 234 outputs the next 16 bytes, when the 24 bytes extends beyond the most significant byte on the output of buffer 234. Shifter 240 shifts the 24 byte input, so the next set of bytes to be supplied on data bus 210 appear on the least significant bytes of the output of shifter 240. The output of shifter 240 is coupled to register 230, which transfers the output of shifter 240 onto data bus 210.

Shifter 240 is coupled to supply the contents of mask 232 and receive the 9 Byte Size & Advance signal. The 9 Byte Size & Advance signal indicates the number of bytes to provide in register 230 for transfer onto streaming data bus 210. The 9 Byte Size & Advance signal covers a range of 0 to 8 bytes. When the advance bit of the signal is deasserted, the entire signal is ignored. Using the contents of the 9 Byte Size & Advance signal, shifter 240 properly aligns data in register 230 so the desired number of bytes for the next data transfer appear in register 230 starting at the least significant byte.

The 16 Byte Size & Advance signal is coupled to buffer 234 and byte selector 238 to indicate that a 16 byte transfer is required on data bus 210. In response to this signal, buffer 234 immediately outputs the next 16 bytes, and register 236 latches the bytes previously on the output of buffer 234. When the advance bit of the signal is deasserted, the entire signal is ignored.

In one embodiment, mode register 224 stores two mode bits. The first bit controls the assertion of the data valid signal. If the first bit is set, streaming input engine 154 asserts the data valid signal once there is valid data in buffer 234. If the first bit is not set, streaming input engine 154 waits until buffer 234 contains at least 32 valid bytes before asserting data valid. The second bit controls the deassertion of the data valid signal. When the second bit is set, engine 154 deasserts data valid when the last byte of data leaves buffer 234. Otherwise, engine 154 deasserts data valid when buffer 234 contains less than 16 valid data bytes.

4. Streaming Output Engine

Figure 13:
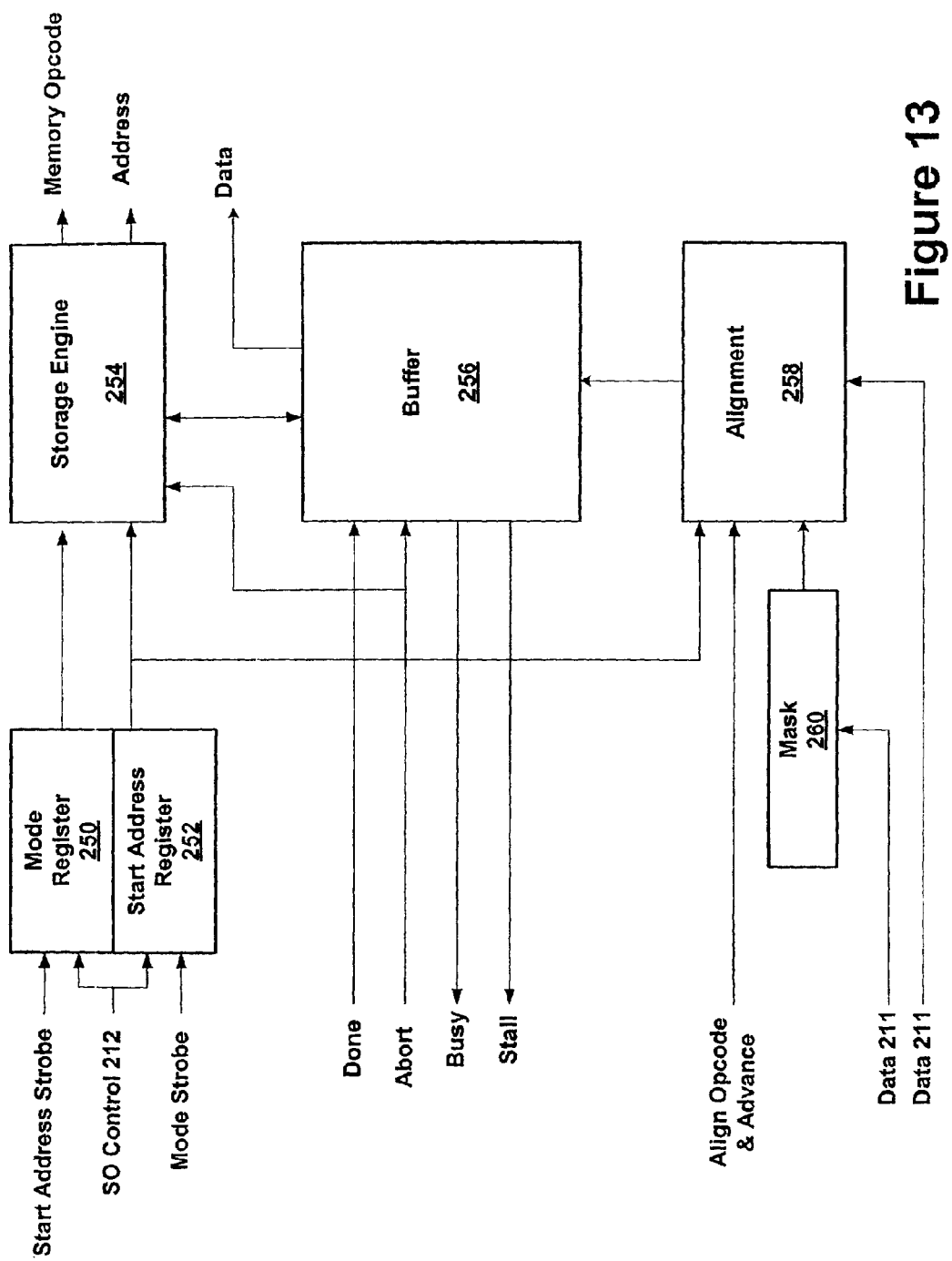
FIG. 13 shows one embodiment of a streaming output engine for the coprocessors shown in FIGS. 9a–9c.

FIG. 13 illustrates one embodiment of streaming output engine 162 in coprocessor 62. Streaming output engine 162 receives data from streaming data bus 211 and stores the data in memory in MPU 10. Streaming data bus 211 provides data to alignment block 258 and mask signals to mask register 260. The mask signals identify the bytes on streaming data bus 211 that are valid. Alignment block 258 arranges the incoming data into its proper position in a 16 byte aligned data word. Alignment block 258 is coupled to buffer 256 to provide the properly aligned data.

Buffer 256 maintains the resulting 16 byte data words until they are written into memory over a data line output of buffer 256, which is coupled to data cache 52 via arbiter 176. Storage engine 254 addresses memory in MPU 10 and provides data storage opcodes over its address and memory opcode outputs. The address and opcode outputs of storage engine 254 are coupled to data cache 52 via arbiter 176. In one embodiment, storage engine 254 issues 16 byte aligned data storage operations.

Streaming output buffer 162 includes configuration registers 250 and 252. Registers 250 and 252 are coupled to receive data from sequencer 150 on data signals in SO control interface 212. Register 250 is coupled to a start address strobe provided by sequencer 150 on SO control interface 212. Register 250 latches the start address data presented on interface 212 when sequencer 150 asserts the start address strobe. Register 252 is coupled to a mode address strobe provided by sequencer 150 on SO control bus 212. Register 252 latches the mode data presented on interface 212 when sequencer 150 asserts the mode strobe.

In one embodiment, mode configuration register 252 contains 2 bits. A first bit controls a cache line burst mode. When this bit is asserted, streaming output engine 162 waits for a full cache line word to accumulate in engine 162 before storing data to memory. When the first bit is not asserted, streaming output engine 162 waits for at least 16 bytes to accumulate in engine 162 before storing data to memory.

The second bit controls assertion of the store-create instruction by coprocessor 62. If the store-create mode bit is not asserted, then coprocessor 62 doesn't assert the store-create opcode. If the store-create bit is asserted, storage engine 254 issues the store-create opcode under the following conditions: 1) If cache line burst mode is enabled, streaming output engine 162 is storing the first 16 bytes of a cache line, and engine 162 has data for the entire cache line; and 2) If cache line burst mode is not enabled, streaming output engine 162 is storing the first 16 bytes of a cache line, and engine 162 has 16 bytes of data for the cache line.

SO control interface 212 includes the following additional signals: 1) Done—asserted by sequencer 150 to instruct streaming output engine 162 that no more data is being provided on data bus 210; 2) Abort—provided by sequencer 150 to instruct streaming output engine 162 to flush buffer 256 and cease issuing store opcodes; 3) Busy—supplied by streaming output engine 162 to indicate there is data in buffer 256 to be transferred to memory; 4) Align Opcode & Advance—supplied by sequencer 150 to identify the number of bytes transferred in a single data transfer on data bus 211. The align opcode can identify 4, 8 or 16 byte transfers in one embodiment. When the advance bit is deasserted, the align opcode is ignored by streaming output engine 162; and 5) Stall—supplied by streaming output engine 162 to indicate buffer 256 is full. In response to receiving the Stall signal, sequencer 150 stalls data transfers to engine 162.

Figure 14:
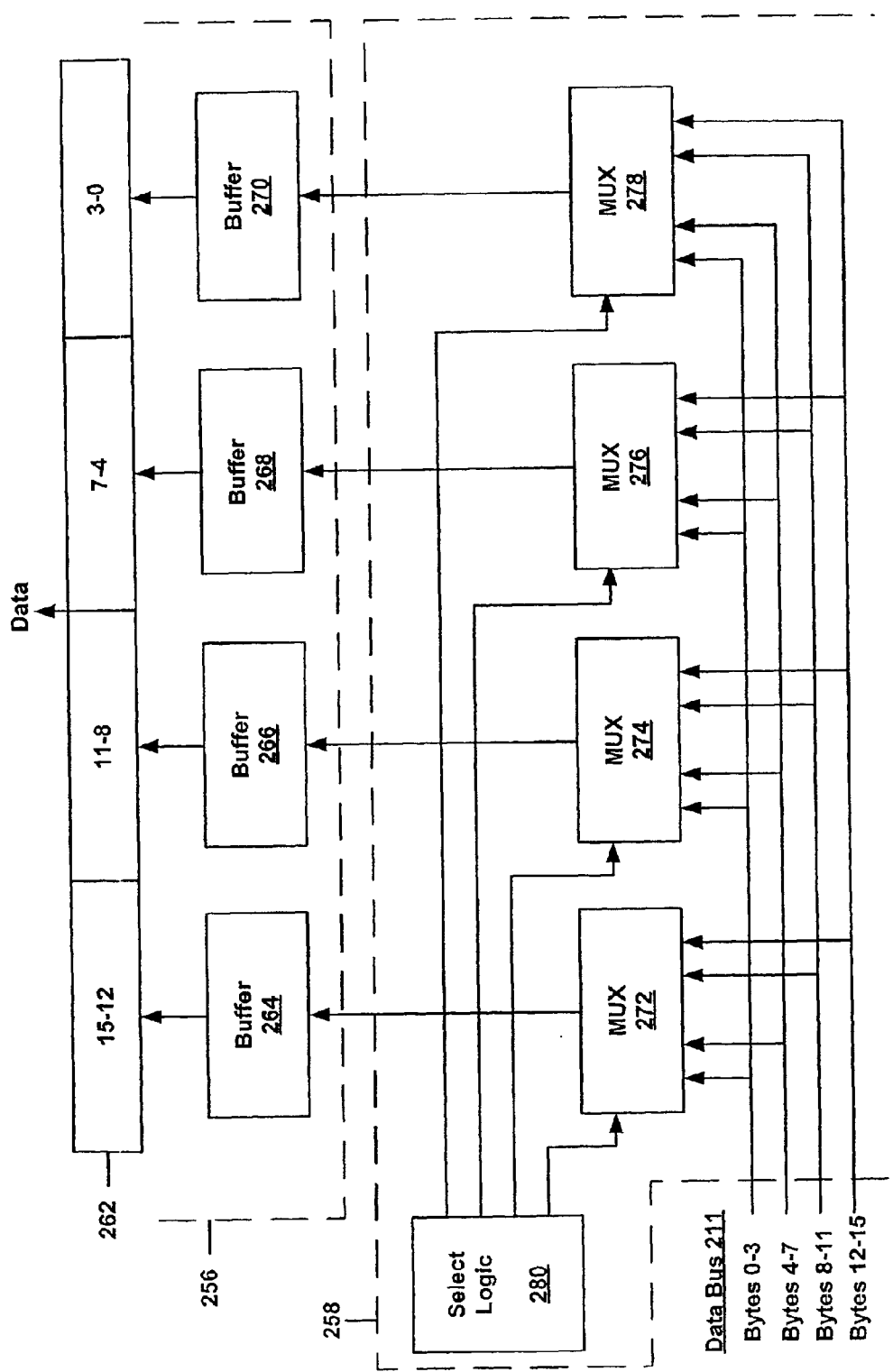
FIG. 14 shows one embodiment of alignment circuitry for use in the streaming output engine shown in FIG. 13.

Alignment block 258 aligns incoming data from streaming data bus 211 in response to the alignment opcode and start address register value. FIG. 14 shows internal circuitry for buffer 256 and alignment block 258 in one embodiment of the invention. Buffer 256 supplies a 16 byte aligned word from register 262 to memory on the output data line formed by the outputs of register 262. Buffer 256 internally maintains 4 buffers, each storing 4 byte data words received from alignment block 256. Data buffer 270 is coupled to output word register 262 to provide the least significant 4 bytes (0–3). Data buffer 268 is coupled to output word register 262 to provide bytes 4–7. Data buffer 266 is coupled to output word register 262 to provide bytes 8–11. Data buffer 264 is coupled to output word register 262 to provide the most significant bytes (12–15).

Alignment block 258 includes multiplexers 272, 274, 276, and 278 to route data from streaming data bus 211 to buffers 264, 266, 268, and 270. Data outputs from multiplexers 272, 274, 276, and 278 are coupled to provide data to the inputs of buffers 264, 266, 268, and 270, respectively. Each multiplexer includes four data inputs. Each input is coupled to a different 4 byte segment of streaming data bus 211. A first multiplexer data input receives bytes 0–3 of data bus 211. A second multiplexer data input receives bytes 4–7 of data bus 211. A third multiplexer input receives bytes 8–11 of data bus 211. A fourth multiplexer data input receives bytes 12–15 of data bus 211.

Each multiplexer also includes a set of select signals, which are driven by select logic 280. Select logic 280 sets the select signals for multiplexers 272, 274, 276, and 278, based on the start address in register 252 and the Align Opcode & Advance Signal. Select logic 280 ensures that data from streaming data bus 211 is properly aligned in output word register 262.

For example, the start address may start at byte 4, and the Align Opcode calls for 4 byte transfers on streaming data bus 211. The first 12 bytes of data received from streaming data bus 211 must appear in bytes 4–15 of output register 262.

When alignment block 258 receives the first 4 byte transfer on bytes 0–3 of bus 211, select logic 280 enables multiplexer 276 to pass these bytes to buffer 268. When alignment block 258 receives the second 4 byte transfer, also appearing on bytes 0–3 of bus 211, select logic 280 enables multiplexer 274 to pass bytes 0–3 to buffer 266. When alignment block 258 receives the third 4 byte transfer, also appearing on bytes 0–3 of bus 211, select logic 280 enables multiplexer 272 to pass bytes 0–3 to buffer 264. As a result, when buffer 256 performs its 16 byte aligned store to memory, the twelve bytes received from data bus 211 appear in bytes 4–15 of the stored word.

In another example, the start address starts at byte 12, and the Align Opcode calls for 8 byte transfers on streaming data bus 211. Alignment block 258 receives the first 8 byte transfer on bytes 0–7 of bus 211. Select logic 280 enables multiplexer 272 to pass bytes 0–3 of bus 211 to buffer 264 and enables multiplexer 278 to pass bytes 4–7 of bus 211 to buffer 270. Alignment block 258 receives the second 8 byte transfer on bytes 0–7 of bus 211. Select logic 280 enables multiplexer 276 to pass bytes 0–3 of bus 211 to buffer 268 and enables multiplexer 274 to pass bytes 4–7 of bus 211 to buffer 266. Register 262 transfers the newly recorded 16 bytes to memory in 2 transfers. The first transfer presents the least significant 4 bytes of the newly received 16 byte transfer in bytes 12–15. The second transfer presents 12 bytes of the newly received data on bytes 0–11.

One of ordinary skill will recognize that FIG. 14 only shows one possible embodiment of buffer 256 and alignment block 258. Other embodiments are possible using well known circuitry to achieve the above-described functionality.

5. RxMAC and Packet Reception a. RxMAC

Figure 15:
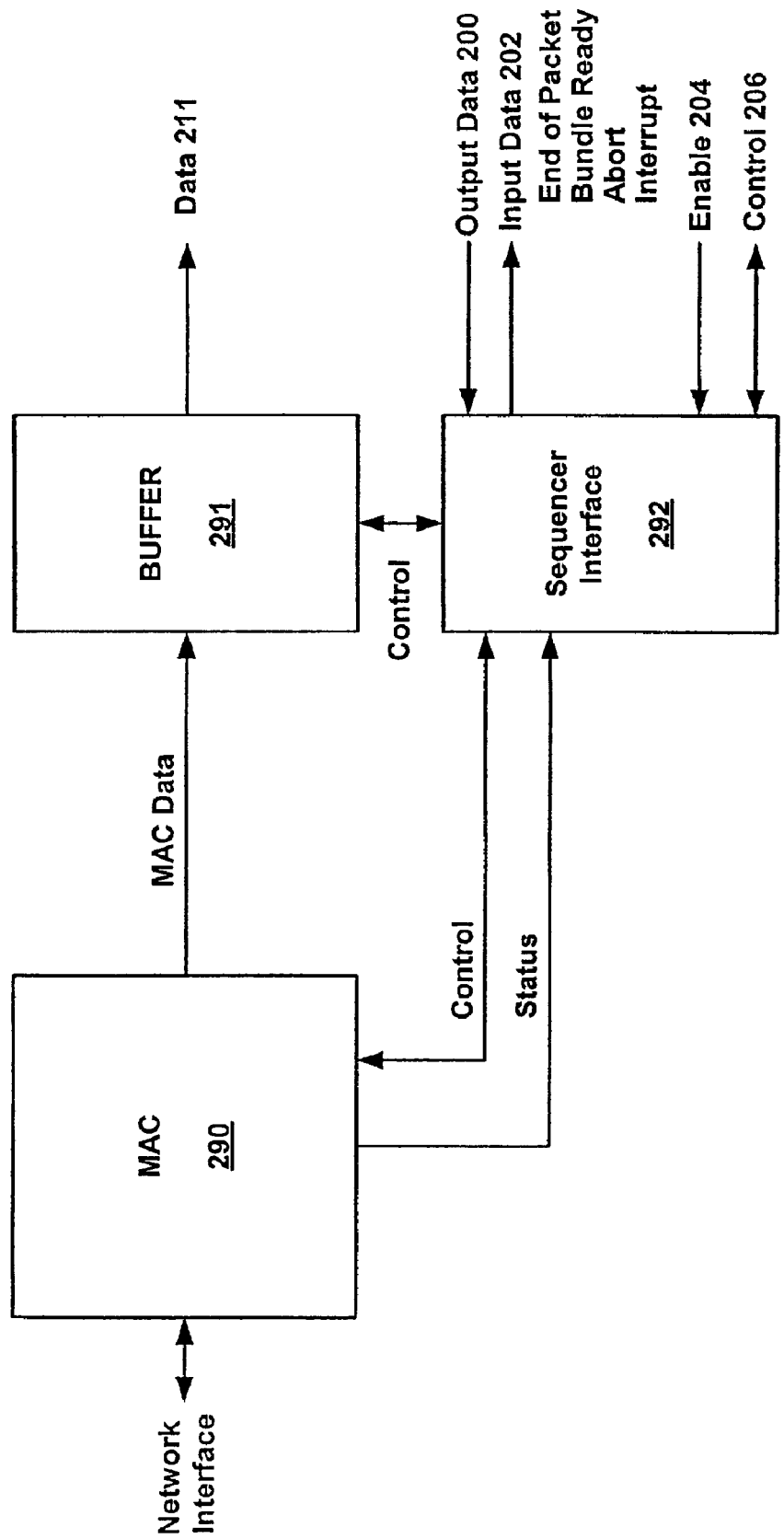
FIG. 15 shows one embodiment of a reception media access controller engine in the coprocessor shown in FIG. 9c.

FIG. 15 illustrates one embodiment of RxMAC 170 in accordance with the present invention. RxMAC 170 receives data from a network and forwards it to streaming output engine 162 for storing in MPU 10 memory. The combination of RxMAC 170 and streaming output engine 162 enables MPU 10 to directly write network data to cache memory, without first being stored in main memory 26.

RxMAC 170 includes media access controller ("MAC") 290, buffer 291, and sequencer interface 292. In operation, MAC 290 is coupled to a communications medium through a physical layer device (not shown) to receive network data, such as data packets. MAC 290 performs the media access controller operations required by the network protocol governing data transfers on the coupled communications medium. Example of MAC operations include: 1) framing incoming data packets; 2) filtering incoming packets based on destination addresses; 3) evaluating Frame Check Sequence ("FCS") checksums; and 4) detecting packet reception errors.

In one embodiment, MAC 290 conforms to the IEEE 802.3 Standard for a communications network supporting GMII Gigabit Ethernet. In one such embodiment, the MAC 290 network interface includes the following signals from the IEEE 802.3z Standard: 1) RXD—an input to MAC 290 providing 8 bits of received data; 2) RX_DV—an input to MAC 290 indicating RXD is valid; 3) RX_ER—an input to MAC 290 indicating an error in RXD; and 4) RX_CLK—an input to MAC 290 providing a 125 MHz clock for timing reference for RXD.

One of ordinary skill will recognize that in alternate embodiments of the present invention MAC 290 includes interfaces to physical layer devices conforming to different network standards. One such standard is the IEEE 802.3 standard for MII 100 megabit per second Ethernet.

In one embodiment of the invention, RXMAC 170 also receives and frames data packets from a point-to-point link with a device that couples MPUs together. One such device is described in U.S. patent application Ser. No. 09/900,514, entitled Cross-Bar Switch, filed on Jul. 6, 2001. In one such embodiment, the point-to-point link includes signaling that conforms to the IEEE 802.3 Standard for GMII Gigabit Ethernet MAC interface operation.

MAC 290 is coupled to buffer 291 to provide framed words (MAC Data) from received data packets. In one embodiment, each word contains 8 bits, while in other embodiments alternate size words can be employed. Buffer 291 stores a predetermined number of framed words, then transfers the words to streaming data bus 211. Streaming output engine 162 stores the transferred data in memory, as will be described below in greater detail. In one such embodiment, buffer 291 is a first-in-first-out ("FIFO") buffer.

As listed above, MAC 290 monitors incoming data packets for errors. In one embodiment, MAC 290 provides indications of whether the following occurred for each packet: 1) FCS error; 2) address mismatch; 3) size violation; 4) overflow of buffer 291; and 5) RX_ER signal asserted. In one such embodiment, this information is stored in memory in MPU 10, along with the associated data packet.

RxMAC 170 communicates with sequencer 150 through sequencer interface 292. Sequencer interface 292 is coupled to receive data on sequencer output data bus 200 and provide data on sequencer input data bus 202. Sequencer interface 292 is coupled to receive a signal from enable interface 204 to inform RxMAC 170 whether it is activated.

Sequencer 150 programs RxMAC 170 for operation through control registers (not shown) in sequencer interface 292. Sequencer 150 also retrieves control information about RxMAC 170 by querying registers in sequencer interface 292. Sequencer interface 292 is coupled to MAC 290 and buffer 291 to provide and collect control register information.

Control registers in sequencer interface 292 are coupled to sequencer input data bus 202 and output data bus 200. The registers are also coupled to sequencer control bus 206 to provide for addressing and controlling register store and load operations. Sequencer 150 writes one of the control registers to define the mode of operation for RxMAC 170. In one mode, RxMAC 170 is programmed for connection to a communications network and in another mode RxMAC 170 is programmed to the above-described point-to-point link to another device. Sequencer 150 employs another set of control registers to indicate the destination addresses for packets that RxMAC 170 is to accept.

Sequencer interface 292 provides the following signals in control registers that are accessed by sequencer 150: 1) End of Packet—indicating the last word for a packet has left buffer 291; 2) Bundle Ready—indicating buffer 291 has accumulated a predetermined number of bytes for transfer on streaming data bus 210; 3) Abort—indicating an error condition has been detected, such as an address mismatch, FCS error, or buffer overflow; and 4) Interrupt—indicating sequencer 150 should execute an interrupt service routine, typically for responding to MAC 290 losing link to the communications medium. Sequencer interface 292 is coupled to MAC 290 and buffer 291 to receive the information necessary for controlling the above-described signals.

Sequencer 150 receives the above-identified signals in response to control register reads that access control registers containing the signals. In one embodiment, a single one bit register provides all the control signals in response to a series of register reads by sequencer 150. In an alternate embodiment, the control signals are provided on control interface 206. Sequencer 150 responds to the control signals by executing operations that correspond to the signals—this will be described in greater detail below. In one embodiment, sequencer 150 executes corresponding microcode routines in response to the signals. Once sequencer 150 receives and responds to one of the above-described signals, sequencer 150 performs a write operation to a control register in sequencer interface 292 to deassert the signal.

b. Packet Reception

Figure 16:
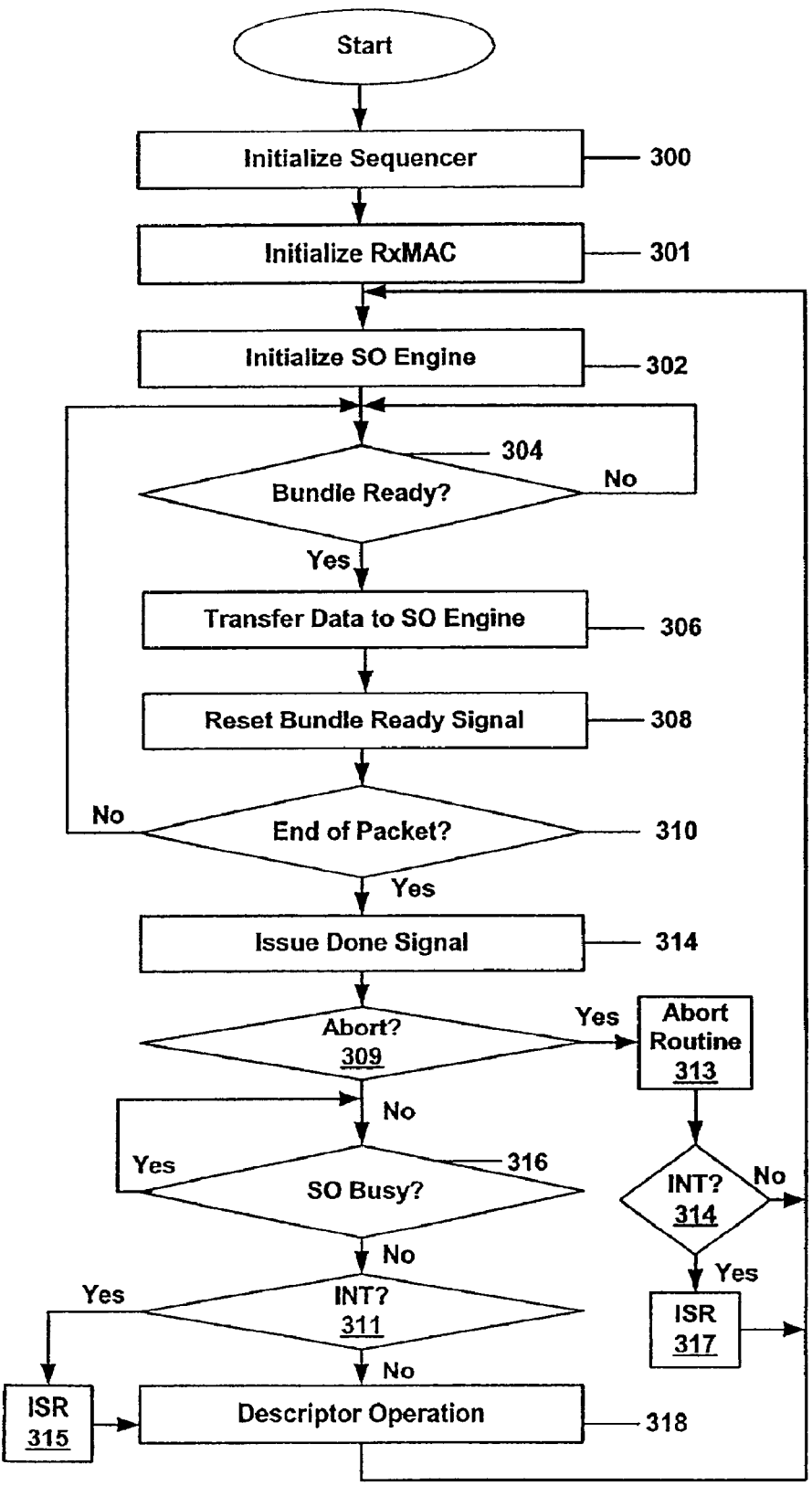
FIG. 16 illustrates a packet reception process in accordance with the present invention.

FIG. 16 illustrates a process for receiving data packets using coprocessor 62 in one embodiment of the present invention. CPU 60 initializes sequencer 152 for managing packet receptions (step 300). CPU 60 provides sequencer 150 with addresses in MPU memory for coprocessor 62 to store data packets. One data storage scheme for use with the present invention appears in detail below.

After being initialized by CPU 60, sequencer 152 initializes RxMAC 170 (step 301) and streaming output engine 172 (step 302). CPU 60 provides RxMAC 170 with an operating mode for MAC 290 and the destination addresses for data packets to be received. CPU 60 provides streaming output engine 172 with a start address and operating modes. The starting address is the memory location where streaming output engine 172 begins storing the next incoming packet. In one embodiment, sequencer 152 sets the operating modes as follows: 1) the cache line burst mode bit is not asserted; and 2) the store-create mode bit is asserted. As described above, initializing streaming output engine 172 causes it to begin memory store operations.

Once initialization is complete, sequencer 152 determines whether data needs to be transferred out of RxMAC 170 (step 304). Sequencer 152 monitors the bundle ready signal to make this determination. Once RxMAC 170 asserts bundle ready, bytes from buffer 291 in RxMAC 170 are transferred to streaming output engine 172 (step 306).

Upon detecting the bundle ready signal (step 304), sequencer 152 issues a store opcode to streaming output engine 172. Streaming output engine 172 responds by collecting bytes from buffer 291 on streaming data bus 211 (step 306). In one embodiment, buffer 291 places 8 bytes of data on the upper 8 bytes of streaming data bus 211, and the opcode causes engine 172 to accept these bytes. Streaming output engine 172 operates as described above to transfer the packet data to cache memory 52 (step 306).

Sequencer 152 also resets the bundle ready signal (step 308). Sequencer 152 resets the bundle ready signal, so the signal can be employed again once buffer 291 accumulates a sufficient number of bytes. Sequencer 152 clears the bundle ready signal by performing a store operation to a control register in sequencer interface 292 in RxMAC 170.

Next, sequencer 152 determines whether bytes remain to be transferred out of RxMAC 170 (step 310). Sequencer 152 makes this determination by monitoring the end of packet signal from RxMAC 170. If RxMAC 170 has not asserted the end of packet signal, sequencer 152 begins monitoring the bundle ready signal again (step 304). If RxMAC 170 has asserted the end of packet signal (step 310), sequencer 152 issues the done signal to streaming output engine 172 (step 314).

Once the done signal is issued, sequencer 152 examines the abort signal in RxMAC 170 (step 309). If the abort signal is asserted, sequencer 152 performs an abort operation (step 313). After performing the abort operation, sequencer 152 examines the interrupt signal in RxMAC 170 (step 314). If the interrupt signal is set, sequencer 152 executes a responsive interrupt service routine ("ISR") (step 317). After the ISR or if the interrupt is not set, sequencer 152 returns to initialize the streaming output engine for another reception (step 302).

If the abort signal was not set (step 309), sequencer 152 waits for streaming output engine 172 to deassert the busy signal (step 316). After sensing the busy signal is deasserted, sequencer 152 examines the interrupt signal in RxMAC 170 (step 311). If the interrupt is asserted, sequencer 152 performs a responsive ISR (step 315). After the responsive ISR or if the interrupt was not asserted, sequencer 152 performs a descriptor operation (step 318). As part of the descriptor operation, sequencer 152 retrieves status information from sequencer interface 292 in RxMAC 170 and writes the status to a descriptor field corresponding to the received packet, as will be described below. Sequencer 152 also determines the address for the next receive packet and writes this value in a next address descriptor field. Once the descriptor operation is complete, sequencer 152 initializes streaming output engine 172 (step 302) as described above. This enables MPU 10 to receive another packet into memory.

Figure 17:
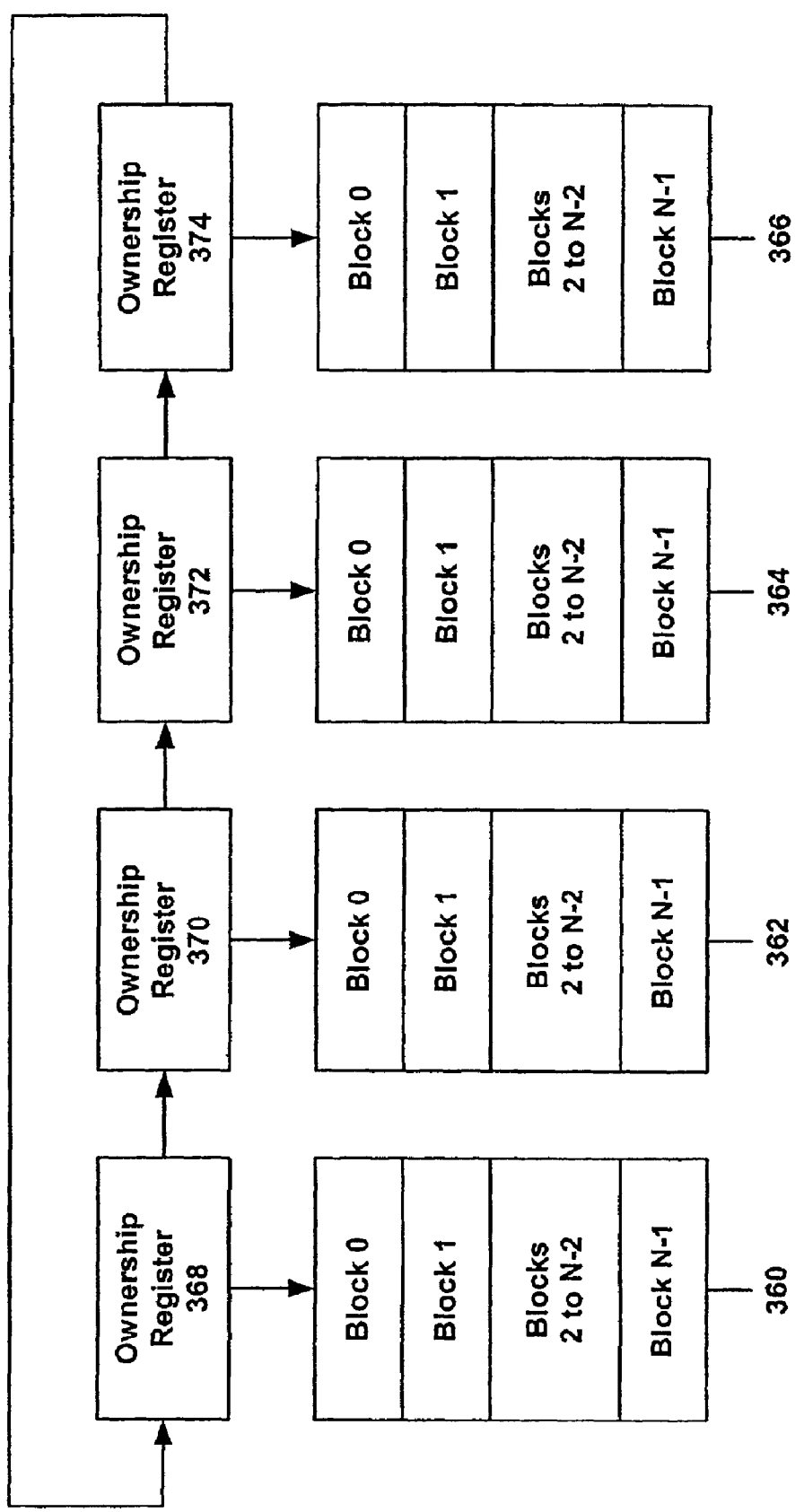
FIG. 17 shows a logical representation of a data management scheme for received data packets in one embodiment of the present invention.

FIG. 17 provides a logical representation of one data management scheme for use in embodiments of the present invention. During sequencer initialization (step 300), the data structure shown in FIG. 17 is established. The data structure includes entries 360, 362, 364, and 366, which are mapped into MPU 10 memory. Each entry includes N blocks of bytes. Sequencer 152 maintains corresponding ownership registers 368, 370, 372, and 374 for identifying ownership of entries 360, 362, 364, and 366, respectively.

In one embodiment, each entry includes 32 blocks, and each block includes 512 bytes. In one such embodiment, blocks 0 through N−1 are contiguous in memory and entries 360, 362, 364, and 366 are contiguous in memory.

Streaming output engine 172 stores data received from RxMAC 170 in entries 360, 362, 364, and 366. CPU 60 retrieves the received packets from these entries. As described with reference to FIG. 16, sequencer 152 instructs streaming output engine 172 where to store received data (step 302). Sequencer 152 provides streaming input engine 172 with a start address offset from the beginning of a block in an entry owned by sequencer 152. In one embodiment, the offset includes the following fields: 1) Descriptor—for storing status information regarding the received packet; and 2) Next Packet Pointer—for storing a pointer to the block that holds the next packet. In some instances reserved bytes are included after the Next Packet Pointer.

As described with reference to FIG. 16, sequencer 152 performs a descriptor operation (step 318) to write the Descriptor and Next Packet Pointer fields. Sequencer 152 identifies the Next Packet Pointer by counting the number of bytes received by RxMAC 170. This is achieved in one embodiment by counting the number of bundle ready signals (step 304) received for a packet. In one embodiment, sequencer 152 ensures that the Next Packet Pointer points to the first memory location in a block. Sequencer 152 retrieves information for the Descriptor field from sequencer interface 292 in RxMAC 170 (FIG. 15).

In one embodiment, the Descriptor field includes the following: 1) Frame Length—indicating the length of the received packet; 2) Frame Done—indicating the packet has been completed; 3) Broadcast Frame—indicating whether the packet has a broadcast address; 4) Multicast Frame—indicating whether the packet is a multicast packet supported by RxMAC 170; 5) Address Match—indicating whether an address match occurred for the packet; 6) Frame Error—indicating whether the packet had a reception error; and 7) Frame Error Type—indicating the type of frame error, if any. In other embodiments, additional and different status information is included in the Descriptor field.

Streaming output engine 172 stores incoming packet data into as many contiguous blocks as necessary. If the entry being used runs out of blocks, streaming output engine 172 buffers data into the first block of the next entry, provided sequencer 152 owns the entry. One exception to this operation is that streaming output engine 172 will not split a packet between entry 366 and 360.

In one embodiment, 256 bytes immediately following a packet are left unused. In this embodiment, sequencer 152 skips a block in assigning the next start address (step 318 and step 302) if the last block of a packet has less than 256 bytes unused.

After initialization (step 300), sequencer 152 possesses ownership of entries 360, 362, 364, and 366. After streaming output engine 172 fills an entry, sequencer 152 changes the value in the entry's corresponding ownership register to pass ownership of the entry to CPU 60. Once CPU 60 retrieves the data in an entry, CPU 60 writes the entry's corresponding ownership register to transfer entry ownership to sequencer 152. After entry 366 is filled, sequencer 152 waits for ownership of entry 360 to be returned before storing any more packets.

6. TxMAC and Packet Transmission a. TxMAC

Figure 18:
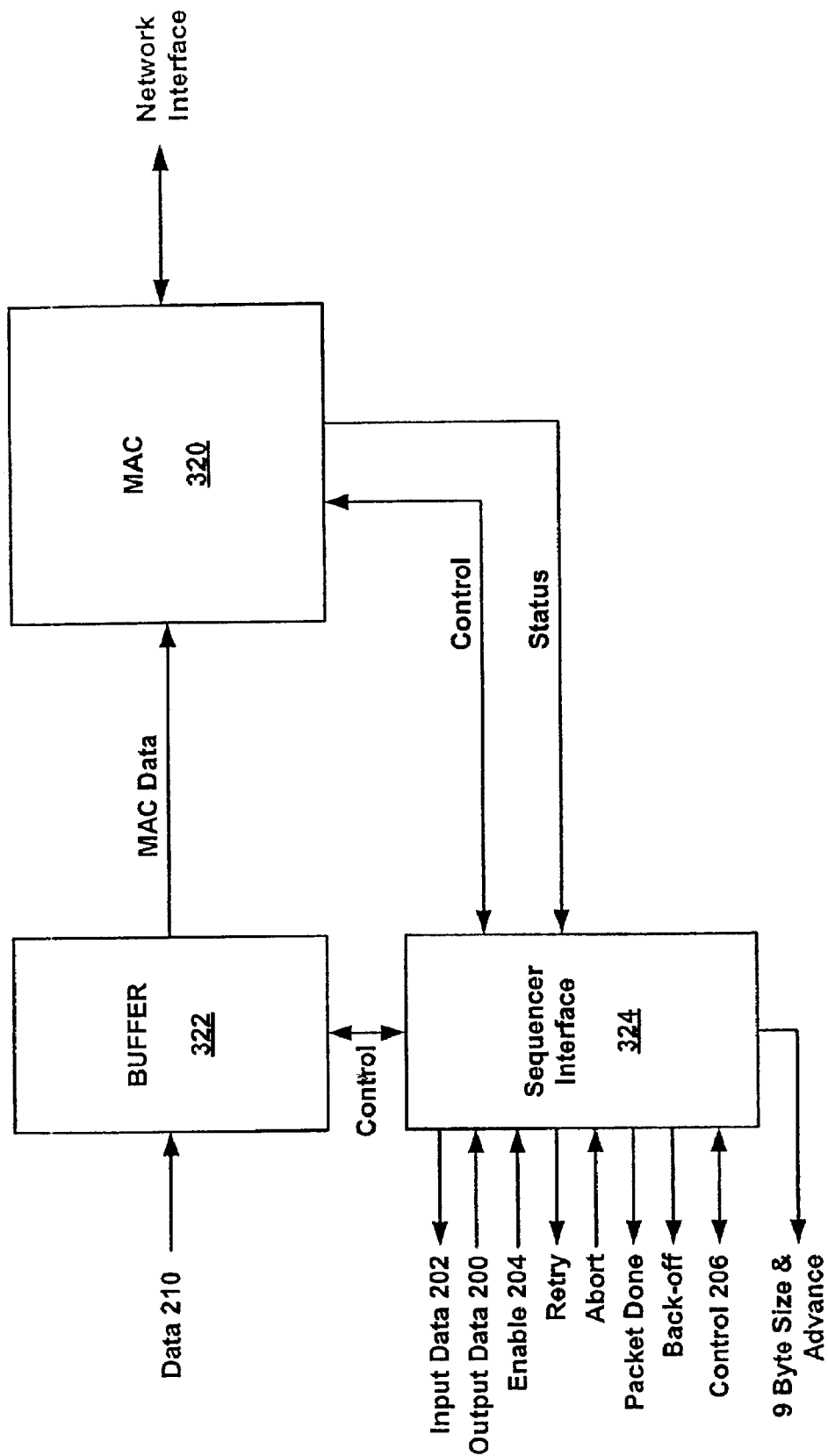
FIG. 18 shows one embodiment of a transmission media access controller engine in the coprocessors shown in FIG. 9c.

FIG. 18 illustrates one embodiment of TxMAC 160 in accordance with the present invention. TxMAC 160 transfers data from MPU 10 to a network interface for transmission onto a communications medium. TxMAC 160 operates in conjunction with streaming input engine 154 to directly transfer data from cache memory to a network interface, without first being stored in main memory 26.

TxMAC 160 includes media access controller ("MAC") 320, buffer 322, and sequencer interface 324. In operation, MAC 320 is coupled to a communications medium through a physical layer device (not shown) to transmit network data, such as data packets. As with MAC 290, MAC 320 performs the media access controller operations required by the network protocol governing data transfers on the coupled communications medium. Example of MAC transmit operations include, 1) serializing outgoing data packets; 2) applying FCS checksums; and 3) detecting packet transmission errors.

In one embodiment, MAC 320 conforms to the IEEE 802.3 Standard for a communications network supporting GMII Gigabit Ethernet. In one such embodiment, the MAC 320 network interface includes the following signals from the IEEE 802.3z Standard: 1) TXD—an output from MAC 320 providing 8 bits of transmit data; 2) TX_EN—an output from MAC 320 indicating TXD has valid data; 3) TX_ER—an output of MAC 320 indicating a coding violation on data received by MAC 320; 4) COL—an input to MAC 320 indicating there has been a collision on the coupled communications medium; 5) GTX_CLK—an output from MAC 320 providing a 125 MHz clock timing reference for TXD; and 6) TX_CLK—an output from MAC 320 providing a timing reference for TXD when the communications network operates at 10 megabits per second or 100 megabits per second.

One of ordinary skill will recognize that in alternate embodiments of the present invention MAC 320 includes interfaces to physical layer devices conforming to different network standards. In one such embodiment, MAC 320 implements a network interface for the IEEE 802.3 standard for MII 100 megabit per second Ethernet.

In one embodiment of the invention, TxMAC 160 also transmits data packets to a point-to-point link with a device that couples MPUs together, such as the device described in U.S. patent application Ser. No. 09/900,514, entitled Cross-Bar Switch, filed on Jul. 6, 2001. In one such embodiment, the point-to-point link includes signaling that conforms to the GMII MAC interface specification.

MAC 320 is coupled to buffer 322 to receive framed words for data packets. In one embodiment, each word contains 8 bits, while in other embodiments alternate size words are employed. Buffer 322 receives data words from streaming data bus 210. Streaming input engine 154 retrieves the packet data from memory, as will be described below in greater detail. In one such embodiment, buffer 322 is a first-in-first-out ("FIFO") buffer.

As explained above, MAC 320 monitors outgoing data packet transmissions for errors. In one embodiment, MAC 320 provides indications of whether the following occurred for each packet: 1) collisions; 2) excessive collisions; and 3) underflow of buffer 322.

TxMAC 160 communicates with sequencer 150 through sequencer interface 324. Sequencer interface 324 is coupled to receive data on sequencer output bus 200 and provide data on sequencer input bus 202. Sequencer interface 324 is coupled to receive a signal from enable interface 204 to inform TxMAC 160 whether it is activated.

Sequencer 150 programs TxMAC 160 for operation through control registers (not shown) in sequencer interface 324. Sequencer 150 also retrieves control information about TxMAC 160 by querying these same registers. Sequencer interface 324 is coupled to MAC 320 and buffer 322 to provide and collect control register information.

The control registers in sequencer interface 324 are coupled to input data bus 202 and output data bus 200. The registers are also coupled to control interface 206 to provide for addressing and controlling register store and load operations. Sequencer 150 writes one of the control registers to define the mode of operation for TxMAC 160. In one mode, TxMAC 160 is programmed for connection to a communications network and in another mode TxMAC 160 is programmed to the above-described point-to-point link to another device. Sequencer 150 employs a register in TxMAC's set of control registers to indicate the number of bytes in the packet TxMAC 160 is sending.

Sequencer interface 324 provides the following signals to sequencer control interface 206: 1) Retry—indicating a packet was not properly transmitted and will need to be resent; 2) Packet Done—indicating the packet being transmitted has left MAC 320; and 3) Back-off—indicating a device connecting MPUs in the above-described point-to-point mode cannot receive a data packet at this time and the packet should be transmitted later.

Sequencer 150 receives the above-identified signals and responds by executing operations that correspond to the signals—this will be described in greater detail below. In one embodiment, sequencer 150 executes corresponding micro-code routines in response to the signals. Once sequencer 150 receives and responds to one of the above-described signals, sequencer 150 performs a write operation to a control register in sequencer interface 320 to deassert the signal.

Sequencer 324 receives an Abort signal from sequencer control interface 206. The Abort signal indicates that excessive retries have been made in transmitting a data packet and to make no further attempts to transmit the packet. Sequencer interface 324 is coupled to MAC 320 and buffer 322 to receive information necessary for controlling the above-described signals and forwarding instructions from sequencer 150.

In one embodiment, sequencer interface 324 also provides the 9 Byte Size Advance signal to streaming input engine 154.

b. Packet Transmission

Figure 19:
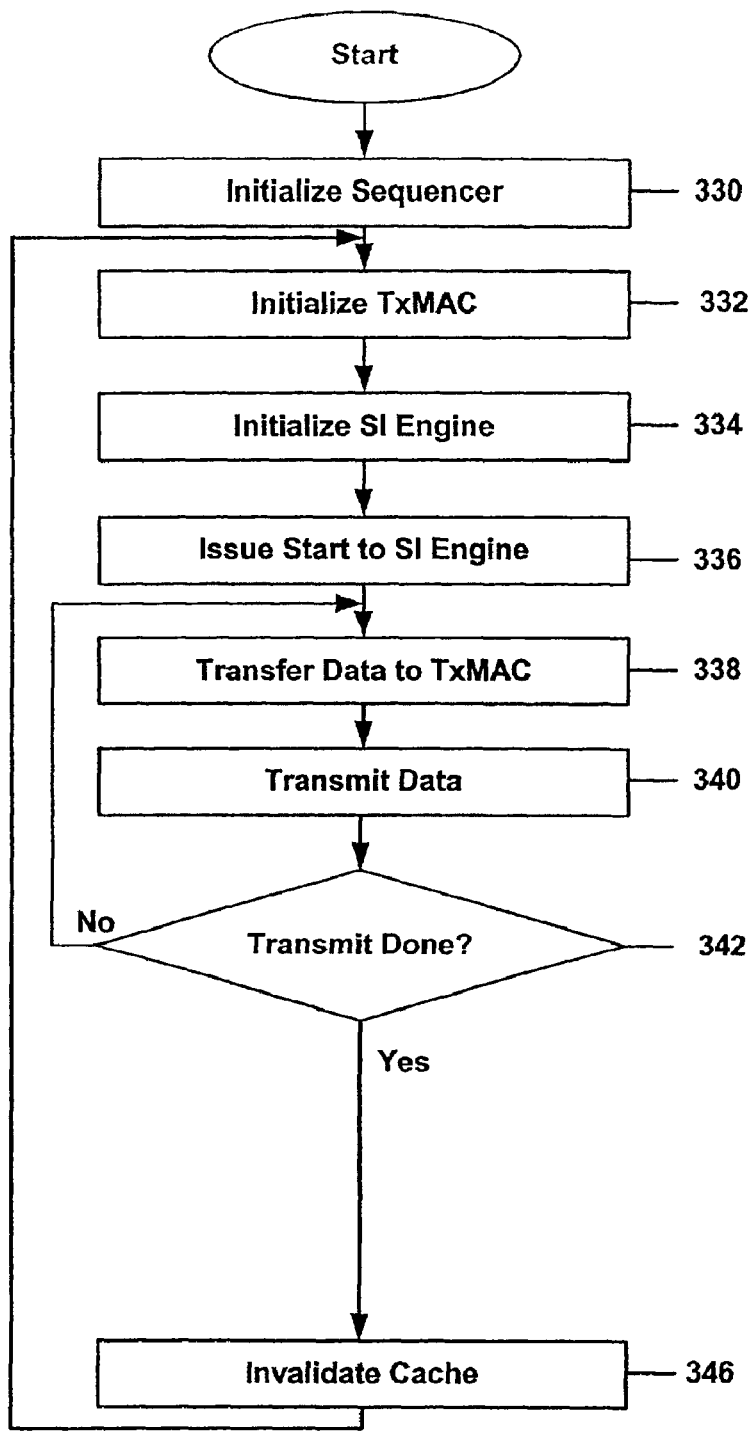
FIG. 19 illustrates a packet transmission process in accordance with one embodiment of the present invention.

FIG. 19 illustrates a process MPU 10 employs in one embodiment of the present invention to transmit packets. At the outset, CPU 60 initializes sequencer 150 (step 330). CPU 60 instructs sequencer 150 to transmit a packet and provides sequencer 150 with the packet's size and address in memory. Next, sequencer 150 initializes TxMAC 160 (step 332) and streaming input engine 154 (step 334).

Sequencer 150 writes to control registers in sequencer interface 324 to set the mode of operation and size for the packet to be transmitted. Sequencer 150 provides the memory start address, data size, and mode bits to streaming input engine 154. Sequencer 150 also issues the Start signal to streaming input engine 154 (step 336), which results in streaming input engine 154 beginning to fetch packet data from data cache 52.

Sequencer 150 and streaming input engine 154 combine to transfer packet data to TxMAC 160 (step 338). TxMAC 160 supplies the 9 Byte Size Signal to transfer data one byte at a time from streaming input engine 154 to buffer 322 over streaming data bus 210. Upon receiving these bytes, buffer 322 begins forwarding the bytes to MAC 320, which serializes the bytes and transmits them to a network interface (step 340). As part of the transmission process, TxMAC 160 decrements the packet count provided by sequencer 150 when a byte is transferred to buffer 322 from streaming input engine 154. In an alternate embodiment, sequencer 150 provides the 9 Byte Size Signal.

During the transmission process, MAC 320 ensures that MAC level operations are performed in accordance with appropriate network protocols, including collision handling. If a collision does occur, TxMAC 320 asserts the Retry signal and the transmission process restarts with the initialization of TxMAC 160 (step 332) and streaming input engine 154 (step 334).

While TxMAC 160 is transmitting, sequencer 150 waits for TxMAC 160 to complete transmission (step 342). In one embodiment, sequencer 150 monitors the Packet Done signal from TxMAC 160 to determine when transmission is complete. Sequencer 150 can perform this monitoring by polling the Packet Done signal or coupling it to an interrupt input.

Once Packet Done is asserted, sequencer 150 invalidates the memory location where the packet data was stored (step 346). This alleviates the need for MPU 10 to update main memory when reassigning the cache location that stored the transmitted packet. In one embodiment, sequencer 150 invalidates the cache location by issuing a line invalidation instruction to data cache 52.

After invalidating the transmit packet's memory location, sequencer 150 can transmit another packet. Sequencer 150 initializes TxMAC 160 (step 332) and streaming input engine 154 (step 334) and the above-described transmission process is repeated.

In one embodiment of the invention, the transmit process employs a bandwidth allocation procedure for enhancing quality of service. Bandwidth allocation allows packets to be assigned priority levels having a corresponding amount of allocated bandwidth. In one such embodiment, when a class exhausts its allocated bandwidth no further transmissions may be made from that class until all classes exhaust their bandwidth—unless the exhausted class is the only class with packets awaiting transmission.

Figure 20:
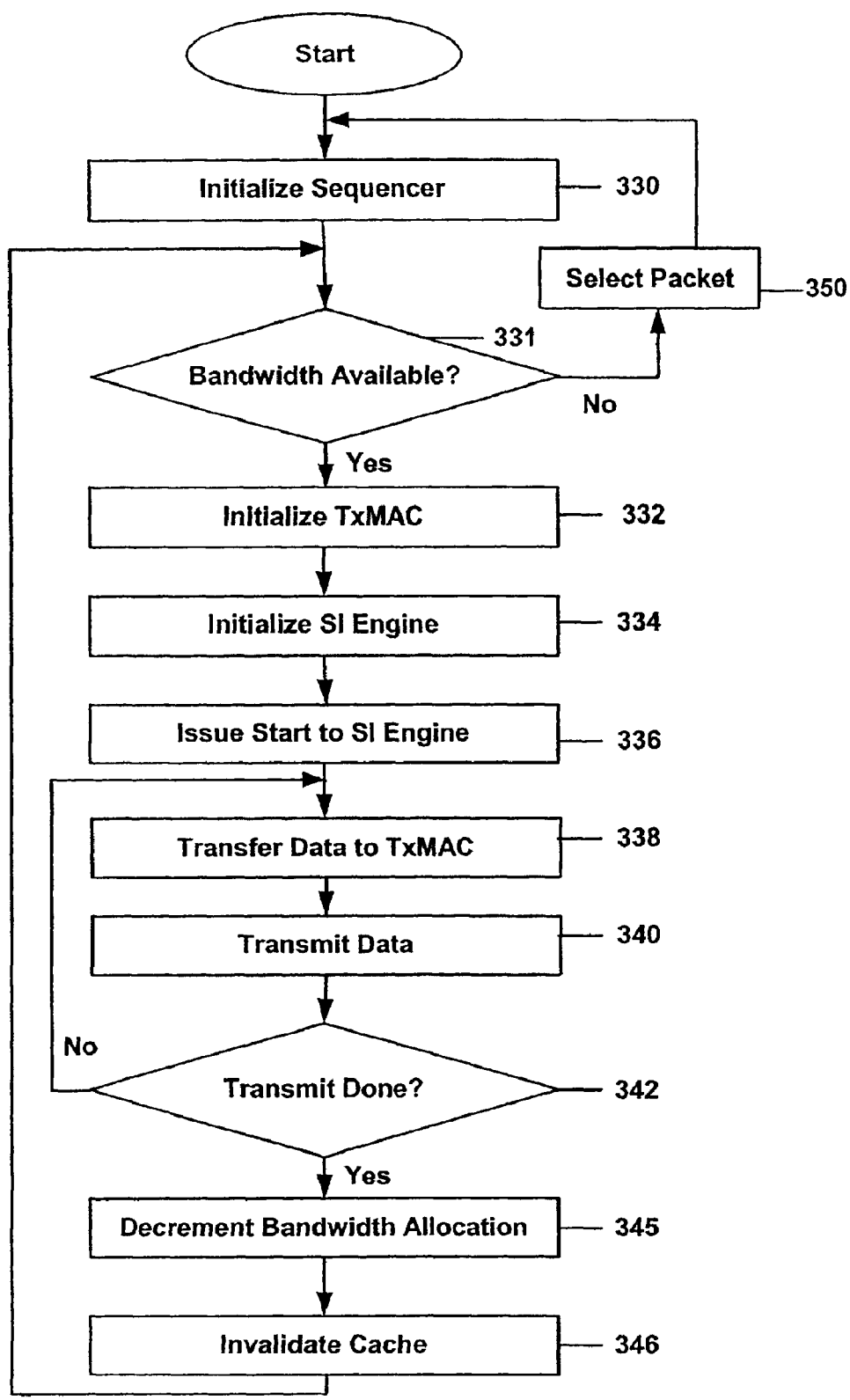
FIG. 20 illustrates a packet transmission process in accordance with an alternate embodiment of the present invention.

Implementing such an embodiment can be achieved by making the following additions to the process described in FIG. 19, as shown in FIG. 20. When CPU 60 initializes sequencer 150 (step 330), CPU 60 assigns the packet to a bandwidth class. Sequencer 150 determines whether there is bandwidth available to transmit a packet with the assigned class (step 331). If not, sequencer 150 informs CPU 60 to select a packet from another class because the packet's bandwidth class is oversubscribed. The packet with the oversubscribed bandwidth class is selected at a later time (step 350). If bandwidth is available for the assigned class, sequencer 150 continues the transmission process described for FIG. 19 by initializing TxMAC 160 and streaming input engine 154. After transmission is complete sequencer 150 decrements an available bandwidth allocation counter for the transmitted packet's class (step 345).

In one embodiment, MPU 10 employs 4 bandwidth classes, having initial bandwidth allocation counts of 128, 64, 32, and 16. Each count is decremented by the number of 16 byte segments in a transmitted packet from the class (step 345). When a count reaches or falls below zero, no further packets with the corresponding class are transmitted—unless no other class with a positive count is attempting to transmit a packet. Once all the counts reach zero or all classes attempting to transmit reach zero, sequencer 150 resets the bandwidth allocation counts to their initial count values.

E. Connecting Multiple MPU Engines

In one embodiment of the invention, MPU 10 can be connected to another MPU using TxMAC 160 or RxMAC 170. As described above, in one such embodiment, TxMAC 160 and RxMAC 170 have modes of operation supporting a point-to-point link with a cross-bar switch designed to couple MPUs. One such cross-bar switch is disclosed in the above-identified U.S. patent application Ser. No. 09/900, 514, entitled Cross-Bar Switch, filed on Jul. 6, 2001. In alternate embodiments, RxMAC 170 and TxMAC 160 support interconnection with other MPUs through bus interfaces and other well known linking schemes.

In one point-to-point linking embodiment, the network interfaces of TxMAC 160 and RxMAC 170 are modified to take advantage of the fact that packet collisions don't occur on a point-to-point interface. Signals specified by the applicable network protocol for collision, such as those found in the IEEE 802.3 Specification, are replaced with a hold-off signal.

In such an embodiment, RxMAC 170 includes a hold-off signal that RxMAC 170 issues to the interconnect device to indicate RxMAC 170 cannot receive more packets. In response, the interconnect device will not transmit any more packets after the current packet, until hold-off is deasserted. Other than this modification, RxMAC 170 operates the same as described above for interfacing to a network.

Similarly, TxMAC 160 includes a hold-off signal input in one embodiment. When TxMAC 160 receives the hold-off signal from the interconnect device, TxMAC halts packet transmission and issues the Back-off signal to sequencer 150. In response, sequencer 150 attempts to transmit the packet at a later time. Other than this modification, TxMAC 160 operates the same as described above for interfacing to a network.

The foregoing detailed description has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. One of ordinary skill in the art will recognize that additional embodiments of the present invention can be made without undue experimentation by combining aspects of the above-described embodiments. It is intended that the scope of the invention be defined by the claims appended hereto.

We claim:

1. A compute engine comprising:
   a central processing unit;
   a coprocessor coupled to said central processing unit, said coprocessor including:
      a sequencer coupled to said central processing unit, and
      a set of application engines coupled to said sequencer, wherein said set of application engines includes:
         a media access controller, and
         a data transfer engine coupled to said media access controller; and
      an arbiter coupled to said sequencer and said data transfer engine,
   wherein said sequencer selectively enables the operation of one or more of said set of application engines to perform applications assigned to the coprocessor by the central processing unit.

2. The compute engine of claim 1, wherein said arbiter is coupled to a set of memory.

3. The compute engine of claim 2, wherein said set of memory is a set of cache memory.

4. The compute engine of claim 1, wherein said media access controller is a reception media access controller and said data transfer engine is a streaming output engine.

5. The compute engine of claim 1, wherein said media access controller is a transmission media access controller and said data transfer engine is an streaming input engine.

6. The compute engine of claim 1, wherein said coprocessor includes a memory management unit coupled to said arbiter.

7. The compute engine of claim 1, wherein a first set of application engines in said set of application engines is coupled to said sequencer via an engine interface, wherein said engine interface includes:
   a data interface,
   an enable interface, and
   a controller interface.

8. The compute engine of claim 7, wherein said first set of application engines includes said media access controller.

9. The compute engine of claim 8, wherein said data transfer engine has a data bus coupled to each application engine in said first set of application engines.

10. The compute engine of claim 7, wherein said data interface transfers data between said sequencer and said first set of application engines.

11. The compute engine of claim 10, wherein said enable interface carries information from said sequencer to said first set of application engines identifying an application engine in said first set of application engines.

12. The compute engine of claim 11, wherein said control interface provides signals to control data exchanges between said sequencer and said first set of application engines.

13. The compute engine of claim 12, wherein said control interface includes a set of arbitrary control signals, wherein signals in said set of arbitrary control signals operate differently for different application engines in said first set of application engines.

14. The compute engine of claim 13, wherein said set of arbitrary control signals includes:
   a first set of signals for transferring and receiving control instructions, wherein said control instruction vary in response to a type of application engine exchanging said control signals with said control interface, and
   a second set of signals for transferring and receiving status information, wherein said status information varies in response to a type of application engine exchanging said status information with said control interface.

15. The compute engine of claim 7, wherein said data transfer engine includes a streaming input engine and a streaming output engine.

16. The compute engine of claim 1, wherein said coprocessor further includes:
   a second sequencer coupled to said central processing unit and said arbiter, and
   a second set of application engines coupled to said second sequencer, wherein said second set of application engines includes:
      a second media access controller, and
      a second data transfer engine coupled to said second media access controller and said arbiter;
   wherein said second sequencer selectively enables the operation of one or more of said second set of application engines to perform applications assigned to the coprocessor by the central processing unit.

17. The compute engine of claim 16, wherein:
   said data transfer engine is a streaming output engine,
   said media access controller is a reception media access controller coupled to provide data to said data transfer engine,
   said second media access controller is a transmission media access controller, and
   said second data transfer engine is a streaming input engine coupled to provide data to said second media access controller.

18. The compute engine of claim 1, wherein said coprocessor includes:
   a set of data registers coupled to said central processing unit;
   a set of control registers coupled to said central processing unit; and
   a control interface coupled to said central processing unit, wherein said control interface includes:
      a first signal indicating an assigned application is complete, and
      a second signal indicating that said set of data registers and said set of control registers are available to be accessed.

19. The compute engine of said claim 18, wherein said control interface includes an interrupt signal.

20. The compute engine of claim 1, wherein said set of application engines includes at least one application engine performing an application from the set of applications consisting of data string copying, polynomial hashing, pattern searching, modulo exponentiation, data encryption, and data decryption.

21. A coprocessor comprising:
   a sequencer;
   a set of application engines coupled to said sequencer, wherein said set of application engines includes:
      a media access controller, and
      a data transfer engine coupled to said media access controller; and
   an arbiter coupled to said sequencer and said data transfer engines,
   wherein said sequencer selectively enables the operation of one or more of said set of application engines to perform applications assigned to the coprocessor by a central processing unit.

22. The coprocessor of claim 21, wherein said arbiter is coupled to a set of cache memory.

23. The coprocessor of claim 21, wherein said media access controller is a reception media access controller and said data transfer engine is a streaming output engine.

24. The coprocessor of claim 21, wherein said media access controller is a transmission media access controller and said data transfer engine is a streaming input engine.

25. The coprocessor of claim 21, wherein said coprocessor includes a memory management unit coupled to said arbiter.

26. The coprocessor of claim 21, wherein a first set of application engines in said set of application engines is coupled to said sequencer via an engine interface, wherein said engine interface includes:
- a data interface,
- an enable interface, and
- a control interface.

27. The coprocessor of claim 26, wherein said first set of application engines includes said media access controller, and
wherein said data transfer engine has a data bus coupled to each application engine in said first set of application engines.

28. The coprocessor of claim 26, wherein said control interface includes a set of arbitrary control signals, wherein signals in said set of arbitrary control signals operate differently for different application engines in said first set of application engines.

29. The coprocessor of claim 28, wherein said set arbitrary control signals includes:
- a first set of signals for transferring and receiving control instructions, wherein said control instructions vary in response to a type of application engine exchanging said control signals with said control interface, and
- a second set of signals for transferring and receiving status information, wherein said status information varies in response to a type of application engine exchanging said status information with said control interface.

30. The coprocessor of claim 21, wherein said coprocessor further includes:
- a second sequencer coupled to said central processing unit and said arbiter; and
- a second set of application engines coupled to said second sequencer, wherein said second set of application engines includes:
  - a second media access controller, and
  - a second data transfer engine coupled to said second media access controller and said arbiter.

31. The coprocessor of claim 30, wherein:
said data transfer engine is a streaming output engine,
said media access controller is a reception media access controller coupled to provide data to said data transfer engine,
said second media access controller is a transmission media access controller, and
said second data transfer engine is a streaming input engine coupled to provide data to said second media access controller.

32. The coprocessor of claim 21, wherein said set of application engines includes at least one application engine performing an application from the set of applications consisting of data string copying, polynomial hashing, pattern searching, modulo exponentiation, data encryption, and data decryption.

33. A processing cluster for use in a system with a main memory, said processing cluster comprising:
- a set of cache memory adapted for coupling to said main memory; and
- a set of compute engines, wherein each compute engine in said set of compute engines is coupled to said set of cache memory and includes a central processing unit and a coprocessor coupled to said central processing unit, wherein said coprocessor includes:
  - a sequencer coupled to said central processing unit,
  - a set of application engines coupled to said sequencer, wherein said set of application engines includes:
    - a media access controller, and
    - a data transfer engine coupled to said media access controller, and
  - an arbiter coupling said sequencer and said data transfer engine to said set of cache memory,
  - wherein said sequencer selectively enables the operation of one or more of said set of application engines to perform applications assigned to the coprocessor by the central processing unit.

34. The processing cluster of claim 33, wherein said coprocessor includes a memory management unit coupled to said arbiter.

35. The processing cluster of claim 33, wherein a first set of application engines in said set of application engines is coupled to said sequencer via an engine interface, wherein said engine interface includes:
- a data interface,
- an enable interface, and
- a control interface.

36. The processing cluster of claim 35, wherein said first set of application engines includes said media access controller, and
wherein said data transfer engine has a data bus coupled to each application engine in said first set of application engines.

37. The processing cluster of claim 35, wherein said control interface includes a set of arbitrary control signals, wherein signals in said set of arbitrary control signals operate differently for different application engines in said first set of application engines.

38. The processing cluster of claim 37, wherein said set of arbitrary control signals includes:
- a first set of signals for transferring and receiving control instructions, wherein said control instructions vary in response to a type of application engine exchanging said control signals with said control interface, and
- a second set of signals for transferring and receiving status information, wherein said status information varies in response to a type of application engine exchanging said status information with said control interface.

39. The processing cluster of claim 33, wherein said coprocessor further includes:
- a second sequencer coupled to said central processing unit and said arbiter, and
- a second set of application engines coupled to said second sequencer, wherein said second set of application engines includes:
  - a second media access controller, and
  - a second data transfer engine coupled to said second media access controller and said arbiter.

40. The processing cluster of claim 39, wherein:
said data transfer engine is a streaming output engine,
said media access controller is a reception media access controller coupled to provide data to said data transfer engine,
said second media access controller is a transmission media access controller, and
said second data transfer engine is a streaming input engine coupled to provide data to said second media access controller.

41. The processing cluster of claim 33, wherein said set of application engines includes at least one application engine performing an application from the set of applications consisting of data string copying, polynomial hashing, pattern searching, modulo exponentiation, data encryption, and data decryption.

42. The processing cluster of claim 33, wherein said processing cluster is formed on a single integrated circuit.

43. A coprocessor comprising:
a first sequencer;
a first set of application engines coupled to said first sequencer, wherein said first set of application engines includes a streaming output engine coupled to application engines in said first set of application engines to receive data, and wherein said first sequencer selectively enables the operation of one or more of said set of application engines to perform applications assigned to the coprocessor by a central processing unit;
a second sequencer;
a second set of application engines coupled to said second sequencer, wherein said second set of application engines includes a streaming input engine coupled to application engines in said second set of application engines to provide data, wherein said second sequencer selectively enables the operation of one or more of said second set of application engines to perform applications assigned to the coprocessor by the central processing unit; and
an arbiter coupling said first sequencer, said second sequencer, said streaming input engine, and said streaming output engine to a set of cache memory.

44. An apparatus comprising:
a central processing unit; and
a coprocessor coupled to said central processing unit, said coprocessor including:
  a first sequencer coupled to said central processing unit,
  a first set of application engines coupled to said first sequencer,
  wherein said first set of application engines includes:
    a reception media, access controller, and
    a streaming output engine coupled to receive data from said reception media access controller,
  a second sequencer coupled to said central processing unit,
  a second set of application engines coupled to said second sequencer,
  wherein said second set of application engines includes:
    a transmission media access controller, and
    a streaming input engine coupled to provide data to said transmission media access controller, and
    an arbiter coupling said first sequencer, said second sequencer, said streaming input engine, and said streaming output engine to a set of cache memory,
  wherein a third set of application engines in said first set of application engines is coupled to said first sequencer via a first engine interface, wherein said first engine interface includes:
    a data interface,
    an enable interface, and
    a control interface,
  wherein a fourth set of application engines in said second set of application engines is coupled to said second sequencer via a second engine interface, wherein said second engine interface includes:
    a data interface,
    an enable interface, and
    a control interface,
  wherein said streaming output engine has a data bus coupled to each application engine in said first set of application engines, and
  wherein said streaming input engine has a data bus coupled to each application engine in said second set of application engines.

* * * * *